United States Patent
Deng et al.

(10) Patent No.: US 11,296,839 B2
(45) Date of Patent: Apr. 5, 2022

(54) DATA TRANSMISSION METHOD AND APPARATUS

(71) Applicant: HUAWEI TECHNOLOGIES CO., LTD., Guangdong (CN)

(72) Inventors: Na Deng, Shenzhen (CN); Haibao Ren, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/119,264

(22) Filed: Aug. 31, 2018

(65) Prior Publication Data

US 2018/0367268 A1 Dec. 20, 2018

Related U.S. Application Data

(63) Continuation of application No. PCT/CN2017/075523, filed on Mar. 3, 2017.

(30) Foreign Application Priority Data

Mar. 3, 2016 (CN) .......................... 201610122422.5

(51) Int. Cl.
*H04L 5/00* (2006.01)
*H04W 72/12* (2009.01)
(Continued)

(52) U.S. Cl.
CPC ........... *H04L 5/0035* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS

2010/0265904 A1* 10/2010 Yang .................... H04J 11/0053
370/329
2013/0114656 A1 5/2013 Sayana et al.
(Continued)

FOREIGN PATENT DOCUMENTS

CN 102625978 A 8/2012
CN 103391624 A 11/2013
(Continued)

OTHER PUBLICATIONS

Irmer et al. "Coordinated Multipoint: Concepts, Performance and Field Trial Results" IEEE Communication Magazine Feb. 2011 (Year: 2011).*
(Continued)

*Primary Examiner* — Jeffrey M Rutkowski
*Assistant Examiner* — Basil Ma
(74) *Attorney, Agent, or Firm* — Fish & Richardson P.C.

(57) ABSTRACT

A data transmission method is disclosed. The method includes: processing, by a network device, first data to obtain at least one first modulation symbol that is in a first antenna port set, where the first antenna port set includes at least one first antenna port; and sending, by the network device, the at least one first modulation symbol to a terminal device in a first subframe by using a first carrier, where the at least one first modulation symbol is different from at least one second modulation symbol that a network device sends to the terminal device in the first subframe by using the first carrier and that is in a second antenna port set, and the second antenna port set includes at least one second antenna port.

14 Claims, 4 Drawing Sheets

A terminal device receives at least one first modulation symbol that a first network device sends in a first subframe by using a first carrier and that is in a first antenna port set, where the at least one first modulation symbol is obtained by processing first data by the network device to which a first cell belongs — S310

The terminal device receives at least one second modulation symbol that a second network device sends in the first subframe by using the first carrier and that is in a second antenna port set, where the at least one second modulation symbol is obtained by processing second data by the second network device, and the at least one second modulation symbol is different from the at least one first modulation symbol — S320

The terminal device performs demodulation processing on the at least one first modulation symbol and the at least one second modulation symbol — S330

(51) Int. Cl.
*H04B 7/0456* (2017.01)
*H04B 7/024* (2017.01)
*H04L 27/00* (2006.01)
*H04W 72/06* (2009.01)

(52) U.S. Cl.
CPC .......... *H04L 5/0044* (2013.01); *H04L 5/0073* (2013.01); *H04L 5/0091* (2013.01); *H04L 27/0008* (2013.01); *H04W 72/06* (2013.01); *H04W 72/12* (2013.01); *H04L 5/001* (2013.01); *H04L 5/0026* (2013.01)

(56) References Cited

U.S. PATENT DOCUMENTS

| | | | | |
|---|---|---|---|---|
| 2013/0279437 | A1* | 10/2013 | Ng | H04L 25/0224 370/329 |
| 2013/0301542 | A1* | 11/2013 | Krishnamurthy | H04W 72/042 370/329 |
| 2013/0308555 | A1* | 11/2013 | Ho | H04L 5/0048 370/329 |
| 2014/0192734 | A1* | 7/2014 | Ng | H04L 5/0035 370/329 |
| 2014/0314011 | A1* | 10/2014 | Guan | H04L 5/0048 370/329 |
| 2015/0023199 | A1* | 1/2015 | Ishida | H04W 80/02 370/252 |
| 2015/0131751 | A1* | 5/2015 | Bayesteh | H04B 7/0482 375/267 |
| 2015/0139138 | A1 | 5/2015 | Seo et al. | |
| 2015/0280871 | A1 | 10/2015 | Xu et al. | |
| 2016/0020837 | A1 | 1/2016 | Schober et al. | |
| 2019/0089435 | A1* | 3/2019 | Mondal | H04B 7/088 |

FOREIGN PATENT DOCUMENTS

| | | | |
|---|---|---|---|
| CN | 103959839 | A | 7/2014 |
| CN | 105191165 | A | 12/2015 |
| EP | 2779765 | A1 | 9/2014 |
| WO | 2013023290 | A1 | 2/2013 |

OTHER PUBLICATIONS

International Search Report and Written Opinion issued in International Application No. PCT/CN2017/075523 dated Apr. 26, 2017, 17 pages.
Extended European Search Report issued in European Application No. 17759280.5 dated Jan. 24, 2019, 8 pages.
3GPP TS 36.321 V11.2.0 (Mar. 2013), "3rd Generation Partnership Project; Technical Specification Group Radio Access Network; Evolved Universal Terrestrial Radio Access (E-UTRA); Medium Access Control (MAC) protocol specification (Release 11)," Mar. 2013, 56 pages.
Office Action issued in Chinese Application No. 201610122422.5 dated Jun. 16, 2020, 15 pages (with English translation).
Office Action issued in Chinese Application No. 201610122422.5 dated Feb. 3, 2020, 17 pages (with English translation).
3GPP TS 36.211 V11.1.0 (Dec. 2012), "3rd Generation Partnership Project; Technical Specification Group Radio Access Network; Evolved Universal Terrestrial Radio Access (E-UTRA); Physical Channels and Modulation (Release 11)," Dec. 2012, 108 pages.
Office Action issued in Chinese Application No. 201610122422.5 dated Oct. 9, 2020, 5 pages.

\* cited by examiner

DATA TRANSMISSION METHOD AND APPARATUS

CROSS-REFERENCE TO RELATED APPLICATIONS

This application is a continuation of International Application No. PCT/CN2017/075523, filed on Mar. 3, 2017, which claims priority to Chinese Patent Application No. 201610122422.5, filed on Mar. 3, 2016. The disclosures of the aforementioned applications are hereby incorporated by reference in their entireties.

TECHNICAL FIELD

The present invention relates to the communications field, and more specifically, to a data transmission method and apparatus.

BACKGROUND

Coordinated multipoint transmission (CoMP) is considered as an effective method for resolving a problem of interference between cells and improving a throughput of an edge user. The CoMP technology may avoid interference and improve a throughput of an edge user by performing joint processing in a plurality of neighboring cells or coordinating edge users. Downlink CoMP technologies mainly include joint transmission (JT), coordinated scheduling (CS), coordinated beamforming (CB), and dynamic point selection/dynamic point blanking (DPS/DPB). In other downlink CoMP solutions than JT, only one transmission point transmits data to a terminal device at one moment.

In an existing JT technology, a plurality of coordinated transmission points transmit same data to a terminal device. Coordinated cells perform physical downlink shared channel (PDSCH) processing in a manner that is completely the same as that used by a serving cell, to obtain a same modulation symbol, and send the modulation symbol on a same resource element. From a perspective of the terminal device, it may be considered that the received data is all from the serving cell, but strength of a wanted signal increases. Therefore, received signal quality of an edge user can be obviously improved, and a throughput of an edge user is improved. However, this solution can obviously improve user experience of only an edge user, and has no desirable effect in improving user experience of a non-edge user.

SUMMARY

Embodiments of the present invention provide a data transmission method and apparatus, which can improve data transmission efficiency or data transmission reliability.

According to a first aspect, a data transmission method is provided, including: processing, by a network device to which a first cell belongs, first data to obtain at least one first modulation symbol that is in a first antenna port set, where the first antenna port set includes at least one first antenna port; and sending, by the network device to which the first cell belongs, the at least one first modulation symbol of the first cell to a terminal device in a first subframe by using a first carrier, where a network device to which a second cell belongs sends at least one second modulation symbol that is obtained by processing second data and that is in a second antenna port set to the terminal device in the first subframe by using the first carrier, the second antenna port set includes at least one second antenna port of the second cell, the at least one first modulation symbol is different from the at least one second modulation symbol, and the at least one first antenna port is different from the at least one second antenna port.

In the data transmission method provided in this embodiment of the present invention, the network device to which the first cell belongs processes the first data to obtain the at least one first modulation symbol of the at least one first antenna port of the first cell. The network device to which the second cell belongs processes the second data to obtain the at least one second modulation symbol of the at least one second antenna port of the second cell. The at least one first modulation symbol is different from the at least one second modulation symbol, and the at least one first antenna port is different from the at least one second antenna port. The network device to which the first cell belongs and the network device to which the second cell belongs respectively send the at least one first modulation symbol and the at least one second modulation symbol to the terminal device in a same frequency band and the same subframe, thereby improving system data transmission efficiency or data transmission reliability.

Optionally, the first cell and the second cell are a same cell, the at least one first antenna port of the first cell belongs to a first transmission point of the first cell, and the at least one second antenna port of the second cell belongs to a second transmission point of the first cell. The first transmission point is different from the second transmission point. In this case, the network devices send the at least one first modulation symbol and the at least one second modulation symbol different from the at least one first modulation symbol to the terminal device in the same frequency band and the same subframe by using the at least one first antenna port of the first transmission point and the at least one second antenna port of the second transmission point respectively.

Optionally, the first cell is different from the second cell, and the network device to which the first cell belongs is the same as the network device to which the second cell belongs. In this case, the network devices send the at least one first modulation symbol and the at least one second modulation symbol different from the at least one first modulation symbol to the terminal device in the same frequency band and the same subframe by using the at least one first antenna port of the first cell and the at least one second antenna port of the second cell respectively.

Optionally, the first cell is different from the second cell, and the network device to which the first cell belongs is different from the network device to which the second cell belongs.

In a first possible implementation of the first aspect, the processing, by a network device to which a first cell belongs, first data to obtain at least one first modulation symbol that is in a first antenna port set includes: performing, by the network device to which the first cell belongs, scrambling processing on a first coded bit corresponding to the first data, to obtain a first scrambled bit; performing, by the network device to which the first cell belongs, layer mapping processing on a first initial modulation symbol corresponding to the first scrambled bit, to obtain the first initial modulation symbol mapped to at least one transport layer; and performing, by the network device to which the first cell belongs, precoding processing on the first initial modulation symbol mapped to the at least one transport layer, to obtain the at least one first modulation symbol that is in the first antenna port set.

Optionally, if the network device to which the first cell belongs is the same as the network device to which the second cell belongs, the method further includes: performing, by the network device, scrambling processing on a second coded bit corresponding to the second data, to obtain a second scrambled bit; performing, by the network device, layer mapping processing on a second initial modulation symbol corresponding to the second scrambled bit, to obtain the second initial modulation symbol mapped to at least one transport layer; and performing, by the network device to which the first cell belongs, precoding processing on the second initial modulation symbol mapped to the at least one transport layer, to obtain the at least one second modulation symbol that is in the second antenna port set.

With reference to the foregoing possible implementation, in a second possible implementation of the first aspect, the performing, by the network device to which the first cell belongs, scrambling processing on a first coded bit corresponding to the first data, to obtain a first scrambled bit includes: if the first cell is a coordinated cell of the terminal device, determining, by the network device to which the first cell belongs, an initial scrambling code value based on a cell identifier of the first cell; and performing, by the network device to which the first cell belongs, scrambling processing on the first coded bit corresponding to the first data by using the initial scrambling code value, to obtain the first scrambled bit.

Optionally, the method includes: sending, by the network device to which the first cell belongs, first indication information to the terminal device, where the first indication information is used to indicate a port number of the at least one first antenna port and/or a port number of the at least one second antenna port.

With reference to the foregoing possible implementations, in a third possible implementation of the first aspect, the method further includes: if the first cell is a serving cell of the terminal device, sending, by the network device to which the first cell belongs, second indication information to the terminal device, where the second indication information is used to indicate a cell identifier of the second cell, so that the terminal device performs demodulation processing on the received at least one second modulation symbol based on the cell identifier of the second cell.

With reference to the foregoing possible implementations, in a fourth possible implementation of the first aspect, the performing, by the network device to which the first cell belongs, layer mapping processing on a first initial modulation symbol corresponding to the first scrambled bit, to obtain the first initial modulation symbol mapped to at least one transport layer includes: if the first cell is a coordinated cell of the terminal device, determining, by the network device to which the first cell belongs, a quantity of the at least one transport layer, where the quantity of the at least one transport layer is determined based on a channel state of a transmission channel between the first cell and the terminal device; and performing, based on the quantity of the at least one transport layer, by the network device to which the first cell belongs, layer mapping processing on the first initial modulation symbol corresponding to the first scrambled bit, to obtain the first initial modulation symbol mapped to the at least one transport layer.

Optionally, if the first cell and the second cell are a same cell, the at least one first antenna port belongs to a first transmission point of the cell, and the at least one second antenna port belongs to a second transmission point of the cell, the network device to which the cell belongs determines a quantity of at least one first transport layer. The quantity of the at least one first transport layer is determined based on a channel state of a transmission channel between the first transmission point and the terminal device. The network device performs, based on the quantity of the at least one first transport layer, layer mapping processing on the first initial modulation symbol corresponding to the first scrambled bit, to obtain the first initial modulation symbol mapped to the at least one first transport layer. The network device determines a quantity of at least one second transport layer. The quantity of the at least one second transport layer is determined based on a channel state of a transmission channel between the second transmission point and the terminal device. The network device performs, based on the quantity of the at least one second transport layer, layer mapping processing on the second initial modulation symbol corresponding to the second scrambled bit, to obtain the second initial modulation symbol mapped to the at least one second transport layer. The second scrambled bit is obtained by the network device by performing scrambling processing on the second coded bit corresponding to the second data.

With reference to the foregoing possible implementations, in a fifth possible implementation of the first aspect, the determining, by the network device to which the first cell belongs, a quantity of the at least one transport layer includes: determining, by the network device to which the first cell belongs, a value of a first transmission rank of the first cell based on the channel state of the transmission channel between the first cell and the terminal device; if a sum of the value of the first transmission rank and a value of a second transmission rank of the second cell is greater than a quantity of receive antennas of the terminal device, determining, by the network device to which the first cell belongs, an adjusted value of the first transmission rank, where the value of the second transmission rank is determined based on a channel state of a transmission channel between the second cell and the terminal device, the adjusted value of the first transmission rank is equal to or not equal to the value of the first transmission rank, an adjusted value of the second transmission rank is equal to or not equal to the value of the second transmission rank, and a sum of the adjusted value of the first transmission rank and the adjusted value of the second transmission rank is less than or equal to the quantity of the receive antennas of the terminal device; and determining, by the network device to which the first cell belongs, the quantity of the at least one transport layer as the adjusted value of the first transmission rank.

Optionally, if the first cell and the second cell are a same cell, the at least one first antenna port belongs to the first transmission point of the cell, and the at least one second antenna port belongs to the second transmission point of the cell, the network device to which the cell belongs determines the value of the first transmission rank of the first transmission point based on the channel state of the transmission channel between the first transmission point and the terminal device, and determines the value of the second transmission rank of the second transmission point based on the channel state of the transmission channel between the second transmission point and the terminal device. If the sum of the value of the first transmission rank and the value of the second transmission rank is greater than the quantity of the receive antennas of the terminal device, the network device determines the adjusted value of the first transmission rank and the adjusted value of the second transmission rank. The adjusted value of the first transmission rank is equal to or not equal to the value of the first transmission rank, the adjusted value of the second transmission rank is equal to or not equal to the value of the second transmission rank, and the sum of the adjusted value of the first transmission rank and the adjusted value of the second transmission rank is less than or equal to the quantity of the receive antennas of the terminal device. The network device determines the quantity of the at least one first transport layer as the adjusted value of the first transmission rank, and determines the quantity of the at least one second transport layer as the adjusted value of the second transmission rank.

With reference to the foregoing possible implementations, in a sixth possible implementation of the first aspect, the performing, by the network device to which the first cell belongs, precoding processing on the first initial modulation symbol mapped to the at least one transport layer, to obtain the at least one first modulation symbol that is in the first antenna port set includes: if the first cell is a coordinated cell of the terminal device, determining, based on the channel state of the transmission channel between the terminal device and the first cell and by the network device to which the first cell belongs, a precoding matrix corresponding to the first cell; and performing, based on the precoding matrix corresponding to the first cell and by the network device to which the first cell belongs, precoding processing on the first initial modulation symbol mapped to the at least one transport layer, to obtain the at least one first modulation symbol that is in the first antenna port set.

With reference to the foregoing possible implementations, in a seventh possible implementation of the first aspect, the sending, by the network device to which the first cell belongs, the at least one first modulation symbol to a terminal device in a first subframe includes: if the network device to which the second cell belongs sends the at least one second modulation symbol to the terminal device by using a second resource block on the first carrier, sending, by the network device to which the first cell belongs, the at least one first modulation symbol to the terminal device by using the second resource block or a first resource block that is on the first carrier and that is different from the second resource block.

With reference to the foregoing possible implementations, in an eighth possible implementation of the first aspect, if the network device to which the first cell belongs sends the at least one first modulation symbol to the terminal device by using the second resource block, a port number of any first antenna port in the first antenna port set is different from a port number of any second antenna port in the second antenna port set.

With reference to the foregoing possible implementations, in a ninth possible implementation of the first aspect, before the network device to which the first cell belongs sends the at least one first modulation symbol to the terminal device in the first subframe by using the first carrier, the method further includes: if the first cell is a serving cell of the terminal device, sending, by the network device to which the first cell belongs, third indication information to the terminal device, where the third indication information is used to indicate a quantity of transport layers used when the network device to which the first cell belongs sends the at least one first modulation symbol and/or a quantity of transport layers used when the network device to which the second cell belongs sends the at least one second modulation symbol.

With reference to the foregoing possible implementations, in a tenth possible implementation of the first aspect, the first data is different from the second data.

In this case, the network device to which the first cell belongs processes the first data to obtain the at least one first modulation symbol of the at least one first antenna port of the first cell. The network device to which the second cell belongs processes the second data different from the first data to obtain the at least one second modulation symbol of the at least one second antenna port of the second cell. The at least one first modulation symbol is different from the at least one second modulation symbol, and the at least one first antenna port is different from the at least one second antenna port. The network device to which the first cell belongs and the network device to which the second cell belongs respectively send the at least one first modulation symbol and the at least one second modulation symbol to the terminal device in the same frequency band and the same subframe, thereby improving data transmission efficiency and a system throughput.

With reference to the foregoing possible implementations, in an eleventh possible implementation of the first aspect, the first data and the second data are same downlink data. The performing, by the network device to which the first cell belongs, precoding processing on the first initial modulation symbol mapped to the at least one transport layer, to obtain the at least one first modulation symbol that is in the first antenna port set includes: performing, by the network device to which the first cell belongs, precoding processing on the first initial modulation symbol by using a first SFBC matrix, to obtain at least two first modulation symbols that are in the first antenna port set, where the at least two first modulation symbols include x1 and x2, the network device to which the second cell belongs performs, by using a second SFBC matrix, precoding processing on a second initial modulation symbol corresponding to the downlink data, to obtain at least two second modulation symbols that are in the second antenna port set, the at least two second modulation symbols include x3 and x4, and x1=x4* and x2=x3*.

Optionally, the network device to which the first cell belongs may perform precoding processing on the first initial modulation symbol by using a first precoding matrix, to obtain a first intermediate modulation symbol. The network device to which the second cell belongs performs precoding processing on the second initial modulation symbol by using a second precoding matrix, to obtain a second intermediate modulation symbol. The first precoding matrix is determined based on the state of the channel between the first cell and the terminal device. The second precoding matrix is determined based on the state of the channel between the second cell and the terminal device. The network device to which the first cell belongs performs precoding processing on the first intermediate modulation symbol by using the first SFBC matrix, to obtain the at least two first modulation symbols. The network device to which the second cell belongs performs precoding processing on the second intermediate modulation symbol by using the second SFBC matrix, to obtain the at least two second modulation symbols. The at least two first modulation symbols include x1 and x2, the at least two second modulation symbols include x3 and x4, and x1=x4* and x2=x3*.

In this case, optionally, the first initial modulation symbol may be the same as the second initial modulation symbol. The network device to which the first cell belongs and the network device to which the second cell belongs may use a same quantity of transport layers. For example, both quantities of transport layers used by the network device to which the first cell belongs and the network device to which the second cell belongs are 1 or 2. The network device to which the first cell belongs and the network device to which the second cell belongs may also use a same initial scrambling code value. For example, both initial scrambling code values used by the network device to which the first cell belongs and the network device to which the second cell belongs are generated based on a cell identifier of the serving cell.

In this case, the network device to which the first cell belongs and the network device to which the second cell belongs send data to the terminal device by using a transmit diversity (which is specifically SFBC) manner, thereby improving coding gains and data transmission reliability.

With reference to the eleventh possible implementation of the first aspect, in a twelfth possible implementation of the first aspect, the method further includes: if the first cell is a serving cell of the terminal device, sending, by the network device to which the first cell belongs, fourth indication information to the network device to which the second cell belongs, where the fourth indication information is used to indicate at least one of the following: a quantity of transport layers and at least two to-be-transmitted first modulation symbols of the first cell; or if the first cell is a coordinated cell of the terminal device, receiving, by the network device to which the first cell belongs, fourth indication information sent by a network device to which a serving cell belongs, where the fourth indication information is used to indicate at least one of the following: a quantity of transport layers and at least two to-be-transmitted second modulation symbols of the serving cell; and determining the at least two first modulation symbols based on the fourth indication information.

According to a second aspect, another data transmission method is provided, including: receiving, by a terminal device, at least one first modulation symbol that a network device to which a first cell belongs sends in a first subframe by using a first carrier and that is in a first antenna port set, where the at least one first modulation symbol is obtained by processing first data by the network device to which the first cell belongs, and the first antenna port set includes at least one first antenna port of the first cell; receiving, by the terminal device, at least one second modulation symbol that a network device to which a second cell belongs sends in the first subframe by using the first carrier and that is in a second antenna port set, where the at least one second modulation symbol is obtained by processing second data by the network device to which the second cell belongs, the at least one second modulation symbol is different from the at least one first modulation symbol, the second antenna port set includes at least one second antenna port of the second cell, and the at least one first antenna port is different from the at least one second antenna port; and performing, by the terminal device, demodulation processing on the at least one first modulation symbol and the at least one second modulation symbol.

Optionally, the first cell and the second cell are a same cell, the at least one first antenna port of the first cell belongs to a first transmission point of the first cell, and the at least one second antenna port of the second cell belongs to a second transmission point of the first cell. The first transmission point is different from the second transmission point. In this case, the network devices send the at least one first modulation symbol and the at least one second modulation symbol different from the at least one first modulation symbol to the terminal device in the same frequency band and the same subframe by using the at least one first antenna port of the first transmission point and the at least one second antenna port of the second transmission point respectively.

Optionally, the first cell is different from the second cell, and the network device to which the first cell belongs is the same as the network device to which the second cell belongs. In this case, the network devices send the at least one first modulation symbol and the at least one second modulation symbol different from the at least one first modulation symbol to the terminal device in the same frequency band and the same subframe by using the at least one first antenna port of the first cell and the at least one second antenna port of the second cell respectively.

Optionally, the first cell is different from the second cell, and the network device to which the first cell belongs is different from the network device to which the second cell belongs.

In a first possible implementation of the second aspect, the network device to which the first cell belongs obtains the at least one first modulation symbol by sequentially performing scrambling processing, layer mapping processing, and precoding processing on a first coded bit corresponding to the first data. The network device to which the second cell belongs obtains the at least one second modulation symbol by sequentially performing scrambling processing, layer mapping processing, and precoding processing on a second coded bit corresponding to the second data.

With reference to the foregoing possible implementation, in a second possible implementation of the second aspect, the network device to which the first cell belongs obtains the at least one first modulation symbol by performing, based on a cell identifier of the first cell, scrambling processing on the first coded bit corresponding to the first data. The network device to which the second cell belongs obtains the at least one second modulation symbol by performing, based on a cell identifier of the second cell, scrambling processing on the second coded bit corresponding to the second data.

Optionally, the method includes: receiving, by the terminal device, first indication information sent by the network device to which the first cell belongs, where the first indication information is used to indicate a port number of the at least one first antenna port and/or a port number of the at least one second antenna port.

Optionally, the method further includes: receiving, by the terminal device, second indication information sent by a network device to which a serving cell belongs, where the second indication information is used to indicate a cell identifier of a coordinated cell.

In this case, optionally, the performing, by the terminal device, demodulation processing on the at least one first modulation symbol and the at least one second modulation symbol includes: performing, by the terminal device, demodulation processing on the received at least one first modulation symbol or the received at least one second modulation symbol based on the cell identifier of the coordinated cell, where the serving cell is the first cell or the second cell, and the coordinated cell is one of the first cell and the second cell other than the serving cell.

With reference to the foregoing possible implementations, in a third possible implementation of the second aspect, the network device to which the first cell belongs obtains the at least one first modulation symbol by performing, based on a quantity of at least one first transport layer, layer mapping processing on a first initial modulation symbol corresponding to a first scrambled bit. The quantity of the at least one first transport layer is determined based on a channel state of a transmission channel between the first cell and the terminal device. The network device to which the second cell belongs obtains the at least one second modulation symbol by performing, based on a quantity of at least one second transport layer, layer mapping processing on a second initial modulation symbol corresponding to a second scrambled bit. The quantity of the at least one second transport layer is determined based on a channel state of a transmission channel between the second cell and the terminal device.

Optionally, if the first cell and the second cell are a same cell, the at least one first antenna port belongs to a first transmission point of the cell, and the at least one second antenna port belongs to a second transmission point of the cell, the quantity of the at least one first transport layer is determined based on a channel state of a transmission channel between the first transmission point and the terminal device, and the quantity of the at least one second transport layer is determined based on a channel state of a transmission channel between the second transmission point and the terminal device.

With reference to the foregoing possible implementations, in a fourth possible implementation of the second aspect, the network device to which the first cell belongs obtains the quantity of the first transport layer by adjusting a value of a first transmission rank that is determined based on a channel state of a transmission channel between the first cell and the terminal device. The network device to which the second cell belongs obtains the quantity of the second transport layer by adjusting a value of a second transmission rank that is determined based on a channel state of a transmission channel between the second cell and the terminal device. A sum of the value of the first transmission rank and the value of the second transmission rank is greater than a quantity of receive antennas of the terminal device, an adjusted value of the first transmission rank is equal to or not equal to the value of the first transmission rank, an adjusted value of the second transmission rank is equal to or not equal to the value of the second transmission rank, and a sum of the adjusted value of the first transmission rank and the adjusted value of the second transmission rank is less than or equal to the quantity of the receive antennas of the terminal device.

Optionally, if the first cell and the second cell are a same cell, the at least one first antenna port belongs to the first transmission point of the cell, and the at least one second antenna port belongs to the second transmission point of the cell, the value of the first transmission rank is determined based on the channel state of the transmission channel between the first transmission point and the terminal device, and the value of the second transmission rank is determined based on the channel state of the transmission channel between the second transmission point and the terminal device.

With reference to the foregoing possible implementations, in a fifth possible implementation of the second aspect, the network device to which the first cell belongs obtains the at least one first modulation symbol by performing, based on a first precoding matrix, precoding processing on the first initial modulation symbol mapped to at least one transport layer. The first precoding matrix is determined based on the channel state of the transmission channel between the terminal device and the first cell. The network device to which the second cell belongs obtains the at least one second modulation symbol by performing, based on a second precoding matrix, precoding processing on the second initial modulation symbol mapped to at least one transport layer. The second precoding matrix is determined based on the channel state of the transmission channel between the terminal device and the second cell.

Optionally, if the first cell and the second cell are a same cell, the at least one first antenna port belongs to the first transmission point of the cell, and the at least one second antenna port belongs to the second transmission point of the cell, the first precoding matrix is determined based on the channel state of the transmission channel between the first transmission point and the terminal device, and the second precoding matrix is determined based on the channel state of the transmission channel between the second transmission point and the terminal device.

With reference to the foregoing possible implementations, in a sixth possible implementation of the second aspect, the network device to which the second cell belongs sends the at least one second modulation symbol by using a second resource block on the first carrier. The network device to which the first cell belongs sends the at least one first modulation symbol by using the second resource block or a first resource block that is on the first carrier and that is different from the second resource block.

With reference to the foregoing possible implementations, in a seventh possible implementation of the second aspect, if the network device to which the first cell belongs sends the at least one first modulation symbol by using the second resource block, a port number of any first antenna port in the first antenna port set is different from a port number of any second antenna port in the second antenna port set.

With reference to the foregoing possible implementations, in an eighth possible implementation of the second aspect, the method further includes: receiving, by the terminal device, third indication information sent by the network device to which the serving cell belongs, where the third indication information is used to indicate a quantity of transport layers used when the network device to which the first cell belongs sends the at least one first modulation symbol and/or a quantity of transport layers used when the network device to which the second cell belongs sends the at least one second modulation symbol.

With reference to the foregoing possible implementations, in a ninth possible implementation of the second aspect, the first data is different from the second data.

With reference to the foregoing possible implementations, in a tenth possible implementation of the second aspect, the first data and the second data are same downlink data. The network device to which the first cell belongs obtains the at least two first modulation symbol by performing precoding processing on the first initial modulation symbol by using a first SFBC matrix. The at least two first modulation symbols include x1 and x2. The network device to which the second cell belongs obtains the at least two second modulation symbol by performing, by using a second SFBC matrix, precoding processing on a second initial modulation symbol corresponding to the downlink data. The at least two second modulation symbols include x3 and x4, and x1=x4* and x2=−x3*.

In some aspects of this embodiment of the present invention, the network device to which the first cell belongs sends the first indication information to the terminal device. The first indication information is used to indicate the port number of the at least one first antenna port of the first cell and/or the port number of the at least one second antenna port of the second cell.

In some aspects of this embodiment of the present invention, the network device to which the first cell belongs sends second indication information to the terminal device. The second indication information is used to indicate a cell identifier of the second cell. The network device to which the first cell belongs sends the at least one first modulation symbol that is in the first antenna port set of the first cell to the terminal device in the first subframe and on the first carrier. The at least one first modulation symbol is different from the at least one second modulation symbol that the network device to which the second cell belongs sends to the terminal device in the first subframe and on the first carrier and that is in the second antenna port set of the second cell.

In some aspects of this embodiment of the present invention, the network device to which the first cell belongs sends the third indication information to the terminal device. The third indication information is used to indicate a quantity of transport layers used when the network device to which the first cell belongs sends the at least one first modulation symbol that is in the first antenna port set of the first cell in the first subframe and on the first carrier, and is used to indicate a quantity of transport layers used when the network device to which the second cell belongs sends the at least one second modulation symbol that is in the second antenna port set of the second cell to the terminal device in the first subframe and on the first carrier.

In some aspects of this embodiment of the present invention, the first network device to which the first cell belongs sends fourth indication information to the second network device to which the second cell belongs. The fourth indication information is used to indicate at least one of the following: a quantity of transport layers and at least two to-be-transmitted first modulation symbols of the first cell.

In some aspects of this embodiment of the present invention, the first network device to which the first cell belongs sends fifth indication information to the second network device to which the second cell belongs. The fifth indication information is used to indicate an SFBC matrix used when the network device to which the second cell belongs processes the second data.

It may be understood that, exchange of the indication information may be combined with or independent from the foregoing data transmission method, and the indication information may be independent from each other or may be used in combination with each other.

According to a third aspect, a data transmission apparatus is provided, configured to execute the method according to the first aspect or any possible implementation of the first aspect. Correspondingly, the apparatus includes functional modules configured to execute the method according to the first aspect or any possible implementation of the first aspect.

In a possible implementation, the apparatus may include: a storage unit and a processor. The storage unit is configured to store an instruction, and the processor is configured to execute the instruction stored by the memory. When the processor executes the instruction stored by the memory, the execution causes the processor to perform the method according to the first aspect or any possible implementation of the first aspect.

According to a fourth aspect, another data transmission apparatus is provided, configured to execute the method according to the second aspect or any possible implementation of the second aspect. Correspondingly, the apparatus includes functional modules configured to execute the method according to the second aspect or any possible implementation of the second aspect.

In a possible implementation, the apparatus may include: a storage unit and a processor. The storage unit is configured to store an instruction, and the processor is configured to execute the instruction stored by the memory. When the processor executes the instruction stored by the memory, the execution causes the processor to perform the method according to the second aspect or any possible implementation of the second aspect.

According to a fifth aspect, a computer readable medium is provided, configured to store a computer program. The computer program includes an instruction used to execute the method according to the first aspect or any possible implementation of the first aspect.

According to a sixth aspect, another computer readable medium is provided, configured to store a computer program. The computer program includes an instruction used to execute the method according to the second aspect or any possible implementation of the second aspect.

According to a seventh aspect, a data transmission system is provided, including the apparatus according to the third aspect or any possible implementation of the third aspect, and including the apparatus based on the fourth aspect or any possible implementation of the fourth aspect.

DESCRIPTION OF EMBODIMENTS

The following describes the technical solutions in the embodiments of the present invention with reference to the accompanying drawings in the embodiments of the present invention.

It should be understood that, the technical solutions in the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex System (TDD), a Universal Mobile Telecommunications System (UMTS), a Worldwide Interoperability for Microwave Access (WiMAX) communications system, or a future 5G system. It may be understood that, the technical solutions in the embodiments of the present invention are applicable to communication between a network device and a terminal device, are also applicable to communication between terminal devices, for example, a transmit end and a receive end in device to device (D2D) and machine to machine (M2M) scenarios, and are also applicable to communication between network devices, for example, a transmit end and a receive end in a scenario of communication between base stations such as a macro base station and a micro base station in a macro-micro coordination scenario.

Figure 1:
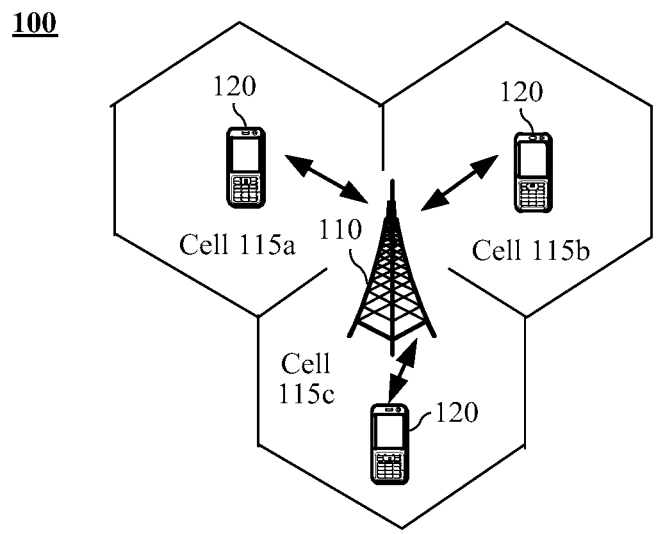
FIG. 1 is a schematic architectural diagram of a communications system applied to an embodiment of the present invention.

FIG. 1 shows a wireless communications system 100 applied to an embodiment of the present invention. The wireless communications system may be a homogeneous network or a heterogeneous network. The wireless communications system 100 may include at least one network device 110. The network device 110 may be a device communicating with a terminal device. Each network device 110 may provide communication coverage for a particular geographical area 115, and may communicate with a terminal device that is located in the coverage area 115. In addition, the entire coverage area 115 of the network device 110 may be divided into a plurality of smaller areas (that is, a plurality of cells). For example, FIG. 1 shows an example in which the coverage area 115 includes three cells 115a, 115b, and 115c. However, the network device in this embodiment of the present invention may also support one cell or another quantity of a plurality of cells. This is not limited in this embodiment of the present invention.

It should be understood that, in this embodiment of the present invention, the network device 110 may be a base transceiver station (BTS) in a GSM system or a CDMA system, a NodeB (NB) in a WCDMA system, an evolved NodeB (eNB or eNodeB) in an LTE system, or a radio controller in a cloud radio access network (CRAN). Alternatively, the network device may be a relay station, an access point, an in-vehicle device, a wearable device, a network side device in a future 5G network, a network device in a future evolved public land mobile network (PLMN), or the like.

The wireless communications system 100 further includes a plurality of terminal devices 120 located within the coverage of the network device 110. The terminal device 120 may be mobile or immobile. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone set, a Session Initiation Protocol (SIP) telephone, a wireless local loop (WLL) station, a personal digital assistant (PDA), a handheld device having a wireless communications function, a computing device or another processing device connected to a wireless modem, an in-vehicle device, a wearable device, a terminal device in a future 5G network, a terminal device in a future evolved PLMN, or the like.

FIG. 1 shows an example of one network device and two terminal devices. Optionally, the wireless communications system 100 may include a plurality of network devices, and coverage of each network device may include another quantity of terminal devices. This is not limited in this embodiment of the present invention.

Optionally, the wireless communications system 100 may further include other network entities such as a network controller and a mobility management entity. This embodiment of the present invention is not limited thereto.

The wireless communications system 100 may support CoMP. To be specific, a plurality of cells or a plurality of transmission points may send data to a same terminal device on a same time-frequency resource in coordination with each other. The plurality of cells may belong to a same network device or different network devices, and may be selected based on a channel gain or a path loss, received signal strength, received signal quality, and the like. Antenna port sets of any two of the plurality of transmission points may not have a same large-scale property (that is, non-quasi co-location), and may belong to a same cell or different cells. This is not limited in this embodiment of the present invention. For the same large-scale property, refer to a definition in a 3GPP standard, or the same large-scale property may be set depending on an actual system requirement. A definition in a current 3GPP standard is that a large-scale property of a channel over which a symbol on an antenna port is transmitted may be deduced by using a large-scale property of a channel over which a symbol on another antenna port is transmitted. Similarly, for the large-scale property, refer to a definition in a 3GPP standard, or the large-scale property may be set depending on an actual system requirement. In the current 3GPP standard, the large-scale property may include one or more of delay spread, Doppler spread, a Doppler frequency shift, an average gain, and an average delay.

Optionally, if the terminal device is located at an edge of a cell and a user throughput is relatively low (for example, lower than 5% of a cumulative distribution function (CDF) curve of a user rate), a plurality of cells may separately send same data to the terminal device on a same time-frequency resource in coordination with each other, to implement signal enhancement and interference reduction on the terminal device. Optionally, for a terminal device located at an edge of a cell or in another area of the cell, a plurality of cells or a plurality of transmission points may perform multibeam transmit diversity or multiflow space division multiplexing transmission in coordination with each other. To be specific, a plurality of cells or a plurality of transmission points may send different modulation symbols to the terminal device on a same time-frequency resource, to improve data transmission reliability or data transmission efficiency. However, this embodiment of the present invention is not limited thereto.

Figure 2:
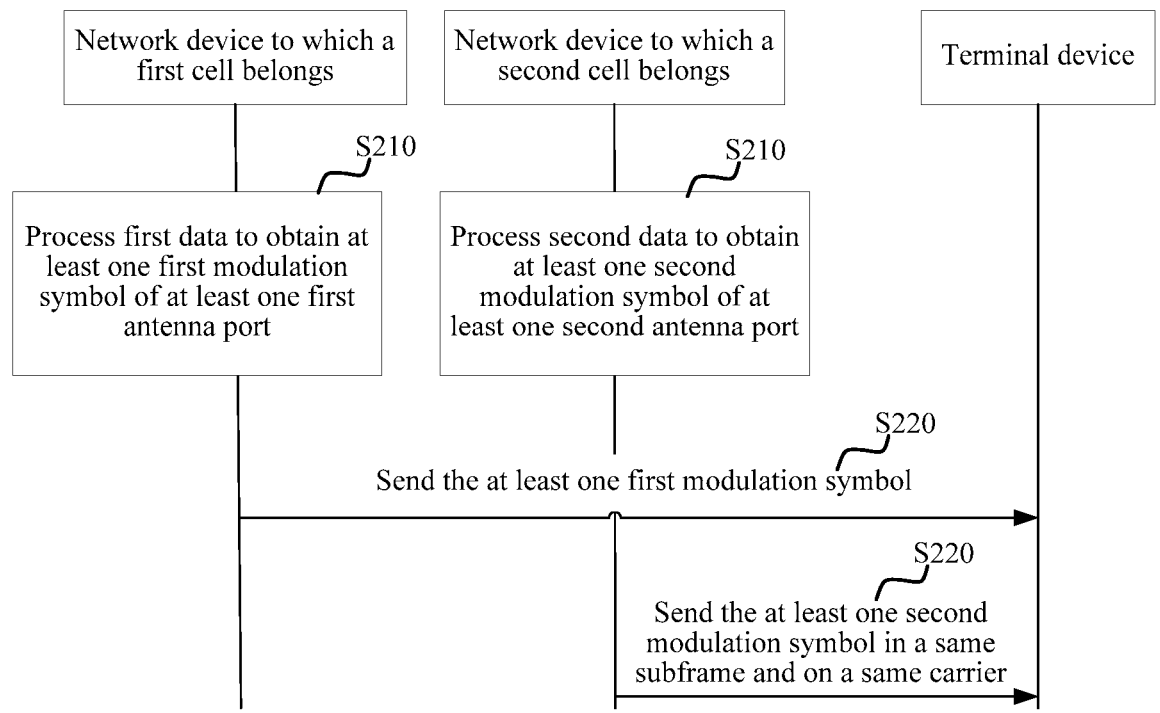
FIG. 2 is a schematic flowchart of a data transmission method according to an embodiment of the present invention.

FIG. 2 is a schematic flowchart of a data transmission method 200 according to an embodiment of the present invention.

S210. A first network device processes first data to obtain at least one first modulation symbol that is in a first antenna port set, and a second network device processes second data to obtain at least one second modulation symbol that is in a second antenna port set, where the at least one second modulation symbol is different from the at least one first modulation symbol.

The first antenna port set may include at least one first antenna port of a first cell of the first network device, and the second antenna port set may include at least one second antenna port of a second cell of the second network device. The at least one first antenna port is different from the at least one second antenna port. Alternatively, the first antenna port set may include at least one first antenna port of a first transmission point of the first network device, and the second antenna port set may include at least one second antenna port of a second transmission point of the second network device. The at least one first antenna port is different from the at least one second antenna port.

The first modulation symbol and the second modulation symbol may be specifically an orthogonal frequency division multiplexing (OFDM) symbol, or may be another type of modulation symbol. This is not limited in this embodiment of the present invention.

Specifically, any one of the at least one first modulation symbol may be different from any one of the at least one second modulation symbol. In other words, the at least one first modulation symbol and the at least one second modulation symbol have no intersection. Alternatively, some of the at least one first modulation symbol may be the same as some of the at least one second modulation symbol, and the other first modulation symbols are different from the other second modulation symbols. This is not limited in this embodiment of the present invention.

The first network device and the second network device may separately send the at least one first modulation symbol and the at least one second modulation symbol different from the at least one first modulation symbol by using the at least one first antenna port and the at least one second antenna port different from the at least one first antenna port. The first network device is a network device to which the first cell or the first transmission point belongs. The second network device is a network device to which the second cell or the second transmission point belongs. The first network device and the second network device may be a same network device, or may be different network devices. This is not limited in this embodiment of the present invention.

Any one of the at least one first antenna port may be different from any one of the at least one second antenna port. Optionally, the at least one first antenna port and the at least one second antenna port may belong to the first cell and the second cell respectively, the first cell belongs to the first network device, and the second cell belongs to the second network device. In this case, the first cell may be different from the second cell. For example, the first cell and the second cell may have different physical cell identifiers. Alternatively, the first cell and the second cell may be a same cell, the at least one first antenna port may specifically belong to the first transmission point of the cell, and the at least one second antenna port may belong to the second transmission point that is of the cell and that is different from the first transmission point.

Optionally, the first cell may be a current serving cell of the terminal device, and the second cell may be a coordinated cell. Alternatively, the first cell may be a coordinated cell of the terminal device, and the second cell may be a serving cell of the terminal device. There may be one or more coordinated cells participating in one coordinated data transmission. This is not limited in this embodiment of the present invention.

In another optional embodiment, the at least one first antenna port may belong to the first transmission point, and the at least one second antenna port may belong to the second transmission point different from the first transmission point. The first transmission point belongs to the first network device, and the second transmission point belongs to the second network device. In this case, the first transmission point and the second transmission point may belong to a same cell or different cells. This is not limited in this embodiment of the present invention.

Optionally, both the first transmission point and the second transmission point may belong to the serving cell of the terminal device. Alternatively, one of the first transmission point and the second transmission point may belong to the serving cell of the terminal device, and the other transmission point belongs to the coordinated cell of the terminal device. This embodiment of the present invention is not limited thereto.

That the at least one first modulation symbol is different from the at least one second modulation symbol may specifically correspond to different cases. Optionally, the first data is different from the second data. In other words, the first network device and the second network device separately send different downlink data to the terminal device. In this case, the first cell and the second cell may perform multiflow transmission in coordination with each other, or the first transmission point and the second transmission point perform multiflow transmission in coordination with each other. Optionally, the first data and the second data may be same downlink data. Because the first network device and the second network device separately perform different processing on the downlink data, the at least one first modulation symbol is different from the at least one second modulation symbol. For example, the first network device and the second network device separately perform precoding processing on the downlink data by using a space frequency block coding (SFBC) technology. In this case, the first cell and the second cell may perform transmit diversity transmission in coordination with each other, or the first transmission point and the second transmission point may perform transmit diversity transmission in coordination with each other. However, this embodiment of the present invention is not limited thereto.

S220. The first network device sends the at least one first modulation symbol that is in the first antenna port set to a terminal device in a first subframe by using a first carrier, and the second network device sends the at least one second modulation symbol that is in the second antenna port set to the terminal device in the first subframe by using the first carrier.

The first carrier may be a system carrier, and corresponds to a particular frequency band, for example, a frequency band whose center frequency is 800 M or a frequency band whose center frequency is 900 M. The first network device and the second network device may send the at least one first modulation symbol and the at least one second modulation symbol to the terminal device respectively in coordination with each other on a same time resource by using a same frequency band.

Therefore, according to the data transmission method in this embodiment of the present invention, the first network device processes the first data to obtain the at least one first modulation symbol of the at least one first antenna port of the first cell or the first transmission point. The second network device processes the second data to obtain the at least one second modulation symbol of the at least one second antenna port of the second cell or the second transmission point. The at least one first modulation symbol is different from the at least one second modulation symbol, and the at least one first antenna port is different from the at least one second antenna port. This can improve system data transmission efficiency or data transmission reliability.

In addition, in the prior art, when joint transmission is performed on a same data flow in CoMP, a terminal device can perform only single receive timing. In this case, a time difference of signals from two cells to a terminal device side needs to fall within a particular range (in an LTE system, the time difference needs to fall within a cyclic prefix (CP)). A requirement on arrival timing of a signal is relatively high. Therefore, distances between a plurality of cells participating in coordinated transmission and the terminal device should not differ greatly. Consequently, a quantity of cells that can participate in coordination is limited. In this embodiment of the present invention, because cells or transmission points participating in coordination transmit different data flows to the terminal device, the terminal device may perform single receive timing, or may perform multiple receive timing, and a requirement on arrival timing of a signal is relatively low for different cells or transmission points. Therefore, this can increase a quantity of cells or transmission points in a coordination set, and further improve data transmission efficiency and a system throughput.

Receive timing refers to that the terminal device obtains information such as a sampling clock, an initial symbol location, or an initial subframe number, and receives data by receiving timing synchronous information of a network side. The single receive timing refers to that the terminal device receives data based only on one group of the foregoing information. The multiple receive timing refers to that the terminal device obtains a plurality of groups of the foregoing information separately corresponding to different cells, and receives, by using corresponding timing information, data sent by a corresponding cell.

In this embodiment of the present invention, the first network device and the second network device may send the at least one first modulation symbol and the at least one second modulation symbol to the terminal device respectively by using a same time-frequency resource. The time-frequency resource may correspond to a same frequency band and a same time period, and may include a plurality of resource elements. Optionally, the first network device and the second network device may send the at least one first modulation symbol and the at least one second modulation symbol to the terminal device by using a same resource element of the time-frequency resource, or may send the at least one first modulation symbol and the at least one second modulation symbol to the terminal device by using different resource elements of the time-frequency resource. For example, the first network device and the second network device may send the at least one first modulation symbol and the at least one second modulation symbol by occupying symbols of the first subframe that are not completely the same. Alternatively, the first network device and the second network device send the at least one first modulation symbol and the at least one second modulation symbol by occupying different frequency resources of a same symbol. This is not limited in this embodiment of the present invention.

In an optional embodiment, the sending, by the first network device, the at least one first modulation symbol to a terminal device in a first subframe by using a first carrier includes:

if the second network device sends the at least one second modulation symbol to the terminal device by using a second resource block on the first carrier, sending, by the first network device, the at least one first modulation symbol to the terminal device by using the second resource block or a first resource block that is on the first carrier and that is different from the second resource block.

The at least one first antenna port is different from the at least one second antenna port, and a port number of the at least one first antenna port may be the same as or different from a port number of the at least one second antenna port. Specifically, if the first network device and the second network device send the at least one first modulation symbol and the at least one second modulation symbol to the terminal device respectively by using a same physical resource block of the first carrier, to enable the terminal device to distinguish between different data flows, and avoid interference between pilot signals, the port numbers of the at least one first antenna port and the at least one second antenna port may be different (for example, the first network device and the second network device communicate with the terminal device by using different demodulation reference signal (DMRS) antenna ports and corresponding pilots). The different antenna ports may correspond to different port numbers. For example, the first network device may send two layers of data to the terminal device by using ports 7 and 8 of the first cell or the first transmission point, and the second network device may transmit data by using another port of the second cell or the second transmission point other than the ports 7 and 8. Optionally, if the first network device and the second network device transmit the at least one first modulation symbol and the at least one second modulation symbol to the terminal device by using different physical resource blocks of the same time-frequency resource, selection of an antenna port number may not be limited, and cells may send data by independently selecting antenna ports based on respective cases. In other words, the port number of the at least one first antenna port may be the same as or different from the port number of the at least one second antenna port. However, this embodiment of the present invention is not limited thereto.

In an optional embodiment, if the first network device sends the at least one first modulation symbol to the terminal device by using the second resource block of the first carrier, and the second network device sends the at least one second modulation symbol by using the first resource block that is on the first carrier and that is different from the second resource block, the port number of the at least one first antenna port may be different from the port number of the at least one second antenna port.

In another optional embodiment, before S220, the method 200 further includes:

if the first cell is a serving cell of the terminal device or the first transmission point belongs to a serving cell of the terminal device, sending, by the first network device, first indication information to the terminal device, where the first indication information is used to indicate the port number of the at least one first antenna port and/or the port number of the at least one second antenna port.

In this way, the terminal device may receive the at least one first modulation symbol and the at least one second modulation symbol based on the first indication information by using a corresponding antenna port.

In another optional embodiment, S210 of processing, by a first network device, first data to obtain at least one first modulation symbol that is in a first antenna port set includes:

performing, by the first network device, scrambling processing on a first coded bit corresponding to the first data, to obtain a first scrambled bit;

performing, by the first network device, layer mapping processing on a first initial modulation symbol corresponding to the first scrambled bit, to obtain the first initial modulation symbol mapped to at least one transport layer; and performing, by the first network device, precoding processing on the first initial modulation symbol mapped to the at least one transport layer, to obtain the at least one first modulation symbol that is in the first antenna port set.

Optionally, the second network device may also perform similar processing on the second data. Specifically, the second network device may perform scrambling processing on a second coded bit corresponding to the second data, to obtain a second scrambled bit; perform layer mapping processing on a second initial modulation symbol corresponding to the second scrambled bit, to obtain the second initial modulation symbol mapped to at least one transport layer; and perform precoding processing on the second initial modulation symbol mapped to the at least one transport layer, to obtain the at least one second modulation symbol that is in the second antenna port set.

Figure 3:
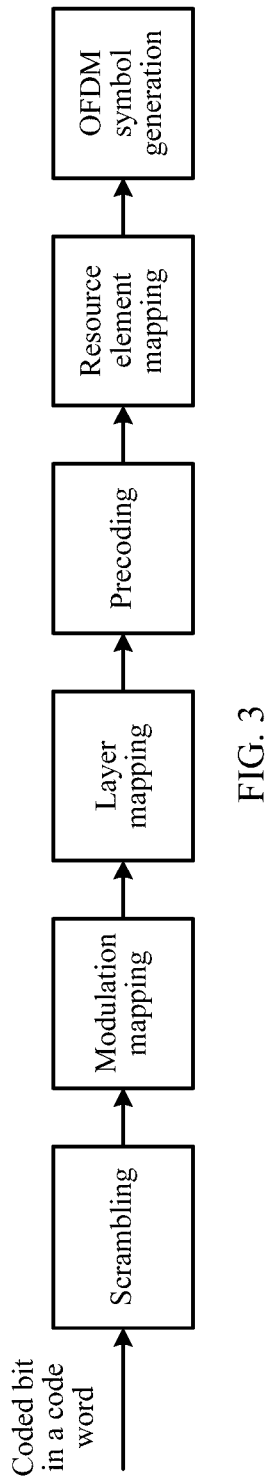
FIG. 3 is a flowchart of data processing in a data transmission method according to an embodiment of the present invention.

Specifically, as shown in FIG. 3, the first network device may perform encoding processing on the first data to obtain the first coded bit corresponding to the first data. The first network device may separately perform encoding processing on each of at least one code word of the first data. Each code word may include at least one coded bit. The first network device may perform scrambling processing on the first coded bit, to obtain the first scrambled bit; perform modulation mapping processing on the first scrambled bit, to obtain a plurality of first initial modulation symbols; perform layer mapping processing on the first initial modulation symbol, to map the first initial modulation symbol to one or more transport layers; perform precoding processing on an initial modulation symbol on each transport layer, to map the initial modulation symbol on the transport layer to one or more antenna ports; and perform resource mapping processing on an initial modulation symbol of each antenna port, to map the modulation symbol of the antenna port to one or more resource elements, and then generate a modulation symbol corresponding to the antenna port.

It should be understood that, the processing process example shown in FIG. 3 is intended to help a person skilled in the art better understand this embodiment of the present invention, instead of limiting the scope of this embodiment of the present invention. A person skilled in the art may obviously make various equivalent modifications or changes based on the example in FIG. 3. For example, one or more steps in the processing process shown in FIG. 3 may not be performed, or several steps in the processing process may be performed simultaneously or in another sequence. The modifications or changes also fall within the scope of this embodiment of the present invention.

In an optional embodiment, the performing, by the first network device, scrambling processing on a first coded bit corresponding to the first data, to obtain a first scrambled bit includes:

determining, by the first network device, an initial scrambling code value based on a cell identifier of the first cell or a cell to which the first transmission point belongs; and performing, by the first network device, scrambling processing on the first coded bit corresponding to the first data by using the initial scrambling code value, to obtain the first scrambled bit.

Similarly, the second network device may determine a second initial scrambling code value based on a cell identifier of the second cell or a cell identifier of a cell to which the second transmission point belongs; and perform, by using the second initial scrambling code value, scrambling processing on the second coded bit corresponding to the second data, to obtain the second scrambled bit.

In this embodiment of the present invention, cells or transmission points participating in coordinated transmission may independently perform scrambling processing on to-be-sent data. Specifically, the cells or the transmission points may separately perform scrambling processing based on respective information. For example, the cells may separately perform scrambling processing by using respective cell identifiers, or the transmission points may separately perform scrambling processing by using cell identifiers of cells to which the transmission points belong. In this case, optionally, an initial scrambling code value $c_{init}$ corresponding to each cell may be shown in formula (1):

$$c_{init}=n_{RNTI} \times 2^{14}+q \times 2^{13}+\lfloor n_s/2 \rfloor \times 2^9+N_{ID}^{cell} \quad (1).$$

$n_{RNTI}$ corresponds to an identifier of the terminal device. q is a code word identifier. When a maximum of two code words may be sent in one subframe, $q \in \{0,1\}$. When a single code word is transmitted, q=0. $n_s$ is a timeslot number, and $N_{ID}^{cell}$ is a physical cell identifier (Physical Cell Identifier, PCI) of the cell.

Optionally, if the first cell is a serving cell of the terminal device or the first transmission point belongs to a serving cell of the terminal device, the first network device may further send second indication information to the terminal device. The second indication information is used to indicate a cell identifier of the second cell or a coordinated cell to which the second transmission point belongs. In this way, the terminal device may receive the second indication information sent by the first network device, determine, based on the second indication information, a cell identifier of at least one coordinated cell participating in current coordinated transmission, and perform descrambling processing on a received modulation symbol based on a cell identifier of each cell.

Optionally, the serving cell may carry cell identifier information of each coordinated cell by quasi co-location (QCL) pilot information sent to the terminal device. However, this embodiment of the present invention is not limited thereto.

In another optional embodiment, the performing, by the first network device, layer mapping processing on a first initial modulation symbol corresponding to the first scrambled bit, to obtain the first initial modulation symbol mapped to at least one transport layer includes:

determining, by the first network device, a quantity of the at least one transport layer, where the quantity of the at least one transport layer is determined based on a state of a channel between the terminal device and the first cell or the first transmission point; and performing, by the first network device, based on the quantity of the at least one transport layer, layer mapping processing on the first initial modulation symbol corresponding to the first scrambled bit, to obtain the first initial modulation symbol mapped to the at least one transport layer.

Similarly, the second network device may determine a quantity of at least one second transport layer, where the quantity of the at least one second transport layer is determined based on a state of a channel between the terminal device and the second cell or the second transmission point; and perform, based on the quantity of the at least one second transport layer, layer mapping processing on the second initial modulation symbol corresponding to the second scrambled bit, to obtain the second initial modulation symbol mapped to the at least one transport layer.

Specifically, different from the prior art in which a coordinated cell performs layer mapping processing in a manner that is completely the same as that used by a serving cell, in this embodiment of the present invention, cells or transmission points participating in coordinated transmission may independently perform layer mapping processing. For example, cells or transmission points participating in coordinated transmission may separately perform layer mapping processing by using different quantities of transport layers. Optionally, a cell or a transmission point participating in coordinated transmission may obtain channel state information of a transmission channel between the cell or the transmission point and the terminal device, and determine, based on the channel state information, a quantity of transport layers used by the cell or the transmission point. For example, the channel state information may include a rank indicator (RI). A quantity of transport layers used by a cell may be determined as a value of an RI corresponding to the cell. The channel state information may be obtained by the cell by measuring uplink information (for example, an uplink pilot signal) sent by the terminal device, or may be obtained by the terminal device by measuring downlink information (for example, a downlink pilot signal or downlink data) sent by the cell. For example, a coordinated cell sends a non-zero power CSI-RS to the terminal device on a time-frequency resource used by a serving cell to send a zero power CSI-RS. In this way, the terminal device may obtain channel state information of a transmission channel between the coordinated cell and the terminal device by measurement. However, this embodiment of the present invention is not limited thereto.

In this embodiment of the present invention, the terminal device may obtain the state information of the channel between the first cell or the first transmission point and the terminal device by measurement. In this case, the first network device may obtain, in a plurality of manners, the channel state information fed back by the terminal device. Optionally, the first network device may receive the channel state information sent by the terminal device. Alternatively, if the first cell or the cell to which the first transmission point belongs is a coordinated cell, and the first network device is different from the second network device, the first network device may receive indication information sent by the second network device. The indication information is used to indicate channel state information corresponding to the first cell. In this case, the terminal device may send channel state information corresponding to each of a plurality of cells to the serving cell. The plurality of cells may include at least one coordinated cell participating in current coordinated transmission. The serving cell may send, to each of the at least one coordinated cell, indication information used to indicate channel state information corresponding to the coordinated cell. However, this embodiment of the present invention is not limited thereto.

In another optional embodiment, a quantity of transport layers that corresponds to a cell participating in coordinated transmission may alternatively not be equal to a value of an RI corresponding to the cell, and instead is obtained by adjusting the value of the RI corresponding to the cell. For example, when a sum of values of RIs corresponding to all cells participating in coordinated transmission is greater than a quantity of receive antennas of the terminal device, a quantity of transport layers that corresponds to one or more cells may be obtained by adjusting a value of an RI corresponding to the one or more cells. This is not limited in this embodiment of the present invention.

Optionally, the determining, by the first network device, a quantity of the at least one transport layer includes:

determining, by the first network device, a value of a first transmission rank based on the state of the channel between the first cell and the terminal device;

if a sum of the value of the first transmission rank and a value of a second transmission rank is greater than the quantity of the receive antennas of the terminal device, determining, by the first network device, an adjusted value of the first transmission rank, where the value of the second transmission rank is determined based on a state of a channel between the second cell and the terminal device, the adjusted value of the first transmission rank is the same as or different from the value of the first transmission rank, an adjusted value of the second transmission rank is the same as or different from the value of the second transmission rank, and a sum of the adjusted value of the first transmission rank and the adjusted value of the second transmission rank is less than or equal to the quantity of the receive antennas of the terminal device; and determining, by the first network device, the quantity of the at least one transport layer as the adjusted value of the first transmission rank.

Specifically, the transmission rank may be specifically an RI. The adjusted value of the first transmission rank may be the same as or different from the value of the first transmission rank, and the adjusted value of the second transmission rank may be the same as or different from the value of the second transmission rank. However, the sum of the adjusted value of the first transmission rank and the adjusted value of the second transmission rank should be less than or equal to the quantity of the receive antennas of the terminal device. In other words, at least one of the value of the first transmission rank and the value of the second transmission rank may be adjusted, to obtain the adjusted value of the first transmission rank and the adjusted value of the second transmission rank.

Optionally, in this embodiment of the present invention, a value of an RI corresponding to the serving cell may keep unchanged, and a value of an RI corresponding to one or more coordinated cells is adjusted. In this case, if the first cell is the serving cell, an adjusted value of a first RI is equal to a value of the first RI. The first network device may adjust a value of a second RI, so that a sum of an adjusted value of the second RI and the value of the first RI is less than or equal to the quantity of the receive antennas of the terminal device. Optionally, the first network device may further send indication information to the second network device. The indication information is used to indicate the adjusted value of the second RI. If the first cell is a coordinated cell, the adjusted value of the second RI is equal to the value of the second RI, and the adjusted value of the first RI is less than the value of the first RI. In this case, optionally, the first network device may receive indication information that is sent by the second network device to indicate the adjusted value of the first RI, and determine the adjusted value of the first RI based on the indication information. Alternatively, the first network device may adjust the value of the first RI. This is not limited in this embodiment of the present invention.

Optionally, in another embodiment, a maximum value of an RI in values of RIs corresponding to all cells participating in current coordinated transmission may keep unchanged, and values of RIs corresponding to other one or more cells are adjusted, so that a sum of adjusted values of the RIs is less than or equal to the quantity of the receive antennas of the terminal device. In this case, a particular cell may adjust the values of the RIs of all the cells. For example, the serving cell or a cell corresponding to the maximum value of the RI performs adjustment, or each cell may adjust a value of an RI corresponding to the cell. Optionally, the first network device may determine a target cell that is of a plurality of cells participating in coordinated transmission and that corresponds to the maximum value of the RI. If the target cell is the first cell, in other words, the first network device determines that the cell to which the first network device belongs is the cell that is of the plurality of cells and that corresponds to the maximum value of the RI, the adjusted value of the first RI is equal to the value of the first RI. Optionally, the first network device may adjust the value of the second RI, so that the sum of the adjusted value of the second RI and the value of the first RI is less than or equal to the quantity of the receive antennas of the terminal device. If the target cell is the second cell, the adjusted value of the second RI is equal to the value of the second RI. The first network device may adjust the value of the first RI, or may receive indication information sent by the second network device to indicate the adjusted value of the first RI, and determine the adjusted value of the first RI based on the indication information. This is not limited in this embodiment of the present invention.

Optionally, in another embodiment, alternatively, a target combination may be determined based on a criterion in possible combinations of values of RIs corresponding to cells (or coordinated cells) participating in coordinated transmission, and values of RIs corresponding to cells in the target combination are determined as adjusted values of the RIs corresponding to the cells. The criterion may be that a total throughput is the highest, a total receiving signal to noise ratio is the largest, or the like. This is not limited in this embodiment of the present invention.

In another optional embodiment, the serving cell may indicate, to the terminal device, a quantity of transport layers used by each cell participating in coordinated transmission. Correspondingly, before S220, the method 200 further includes:

if the first cell is a serving cell of the terminal device, or the first transmission point belongs to a serving cell of the terminal device, sending, by the first network device, third indication information to the terminal device, where the third indication information is used to indicate a quantity of transport layers used when the first network device sends the at least one first modulation symbol and/or a quantity of transport layers used when the second network device sends the at least one second modulation symbol.

In this embodiment of the present invention, the quantity of the receive antennas of the terminal device limits a sum of quantities of transport layers used by cells or transmission points participating in coordinated transmission. For example, two cells perform coordinated transmission, and the terminal device has eight receive antennas and may receive a maximum of eight layers of data. In this case, a quantity L1 of transport layers of the serving cell and a quantity L2 of transport layers of the coordinated cell need to satisfy the following condition: L1+L2≤8. The following lists several possible implementations in the foregoing scenario:

1. A total quantity of layers is two: A serving cell C1 and a coordinated cell C2 have one transport layer each. In other words, L1=L2=1. In this case, a layer mapping relationship may be shown in Table 1:

TABLE 1

Layer mapping example in which a total quantity of layers is two

| Total quantity of layers | Total quantity of code words | Code word-layer mapping $i = 0, 1, \ldots, M_{symb}^{layer} - 1$ | |
| --- | --- | --- | --- |
| 2 | 2 | $x^{(0)}(i) = d^{(0)}(i)$ | $M_{symb}^{layer} =$ |
| | | $x^{(1)}(i) = d^{(1)}(i)$ | $M_{symb}^{(0)} = M_{symb}^{(1)}$ |

$d^{(q)}(0), \ldots, d^{(q)}(M_{symb}^{(q)}-1)$ is an initial modulation symbol corresponding to a code word q, where $q \in \{0,1\}$. $x^{(0)}(i) \ldots x^{(\upsilon-1)}(i), i=0, 1, \ldots, M_{symb}^{layer}-1$ is a modulation symbol mapped to each layer, where $\upsilon$ is a total quantity of layers, and $M_{symb}^{layer}$ is a quantity of initial modulation symbols at each layer.

2. A total quantity of layers is three: There may be two cases. In a first case, the serving cell has two transport layers, and the coordinated cell has one transport layer (L1=2, and L2=1); and in a second case, the serving cell has one transport layer, and the coordinated cell has two transport layers (L1=1, and L2=2). In this case, a corresponding layer mapping relationship may be shown in Table 2:

TABLE 2

Layer mapping example in which a total quantity of layers is three

| Total quantity of layers | Total quantity of code words | Code word-layer mapping $i = 0, 1, \ldots, M_{symb}^{layer} - 1$ | |
| --- | --- | --- | --- |
| 3 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 = M_{symb}^{(1)}$ |
| | | $x^{(2)}(i) = d^{(1)}(i)$ | |
| 3 | 2 | $x^{(0)}(i) = d^{(0)}(i)$ | $M_{symb}^{layer} =$ |
| | | $x^{(1)}(i) = d^{(1)}(2i)$ | $M_{symb}^{(0)} = M_{symb}^{(1)}/2$ |
| | | $x^{(2)}(i) = d^{(1)}(2i + 1)$ | |

3. A total quantity of layers is four: There may be three cases. In a first case, L1=3 and L2=1; in a second case, L1=2 and L2=2; and in a third case, L1=1 and L2=3. In this case, a layer mapping relationship may be shown in Table 3:

TABLE 3

Layer mapping example in which a total quantity of layers is four

| Total quantity of layers | Total quantity of code words | Code word-layer mapping $i = 0, 1, \ldots, M_{symb}^{layer} - 1$ | |
| --- | --- | --- | --- |
| 4 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 = M_{symb}^{(1)}$ |
| | | $x^{(2)}(i) = d^{(0)}(3i + 2)$ | |
| | | $x^{(3)}(i) = d^{(1)}(i)$ | |
| 4 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 = M_{symb}^{(1)}/2$ |
| | | $x^{(2)}(i) = d^{(1)}(2i)$ | |
| | | $x^{(3)}(i) = d^{(1)}(2i + 1)$ | |
| 4 | 2 | $x^{(0)}(i) = d^{(0)}(i)$ | $M_{symb}^{layer} =$ |
| | | $x^{(1)}(i) = d^{(1)}(3i)$ | $M_{symb}^{(0)} = M_{symb}^{(1)}/3$ |
| | | $x^{(2)}(i) = d^{(1)}(3i + 1)$ | |
| | | $x^{(3)}(i) = d^{(1)}(3i + 2)$ | |

4. A total quantity of layers is five: There may be four cases. In a first case, L1=4 and L2=1; in a second case, L1=1 and L2=4; in a third case, L1=3 and L2=2; and in a fourth case, L1=2 and L2=3. In this case, a layer mapping relationship may be shown in Table 4:

TABLE 4

Layer mapping example in which a total quantity of layers is five

| Total quantity of layers | Total quantity of code words | Code word-layer mapping $i = 0, 1, \ldots, M_{symb}^{layer} - 1$ | |
| --- | --- | --- | --- |
| 5 | 2 | $x^{(0)}(i) = d^{(0)}(4i)$ | $M_{symb}^{layer} =$ |
| | | $x^{(1)}(i) = d^{(0)}(4i + 1)$ | $M_{symb}^{(0)}/4 = M_{symb}^{(1)}$ |
| | | $x^{(2)}(i) = d^{(0)}(4i + 2)$ | |
| | | $x^{(3)}(i) = d^{(0)}(4i + 3)$ | |
| | | $x^{(4)}(i) = d^{(1)}(i)$ | |
| 5 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 = M_{symb}^{(1)}/2$ |
| | | $x^{(2)}(i) = d^{(0)}(3i + 2)$ | |
| | | $x^{(3)}(i) = d^{(1)}(2i)$ | |
| | | $x^{(4)}(i) = d^{(1)}(2i + 1)$ | |
| 5 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 = M_{symb}^{(1)}/3$ |
| | | $x^{(2)}(i) = d^{(1)}(3i)$ | |
| | | $x^{(3)}(i) = d^{(1)}(3i + 1)$ | |
| | | $x^{(4)}(i) = d^{(1)}(3i + 2)$ | |
| 5 | 2 | $x^{(0)}(i) = d^{(0)}(i)$ | $M_{symb}^{layer} =$ |
| | | $x^{(1)}(i) = d^{(1)}(4i)$ | $M_{symb}^{(0)} = M_{symb}^{(1)}/4$ |

TABLE 4-continued

Layer mapping example in which a total quantity of layers is five

| Total quantity of layers | Total quantity of code words | Code word-layer mapping $i = 0, 1, \ldots, M_{symb}^{layer} - 1$ |
|---|---|---|
| | | $x^{(2)}(i) = d^{(1)}(4i + 1)$<br>$x^{(3)}(i) = d^{(1)}(4i + 2)$<br>$x^{(4)}(i) = d^{(1)}(4i + 3)$ |

5. A total quantity of layers is six: There may be five cases. In a first case, L1=5 and L2=1; in a second case, L1=4 and L2=2; in a third case, L1=3 and L2=3; in a fourth case, L1=2 and L2=4; and in a fifth case, L1=1 and L2=5. In this case, a layer mapping relationship may be shown in Table 5:

TABLE 5

Layer mapping example in which a total quantity of layers is six

| Total quantity of layers | Total quantity of code words | Code word-layer mapping $i = 0, 1, \ldots, M_{symb}^{layer} - 1$ | |
|---|---|---|---|
| 6 | 2 | $x^{(0)}(i) = d^{(0)}(5i)$<br>$x^{(1)}(i) = d^{(0)}(5i + 1)$<br>$x^{(2)}(i) = d^{(0)}(5i + 2)$<br>$x^{(3)}(i) = d^{(0)}(5i + 3)$<br>$x^{(4)}(i) = d^{(0)}(5i + 4)$<br>$x^{(5)}(i) = d^{(1)}(i)$ | $M_{symb}^{layer} = M_{symb}^{(0)}/5 = M_{symb}^{(1)}$ |
| 6 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(2i)$<br>$x^{(5)}(i) = d^{(1)}(2i + 1)$ | $M_{symb}^{layer} = M_{symb}^{(0)}/4 = M_{symb}^{(1)}/2$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 6 | 2 | $x^{(0)}(i) = d^{(0)}(2i)$<br>$x^{(1)}(i) = d^{(0)}(2i + 1)$<br>$x^{(2)}(i) = d^{(1)}(4i)$<br>$x^{(3)}(i) = d^{(1)}(4i + 1)$<br>$x^{(4)}(i) = d^{(1)}(4i + 2)$<br>$x^{(5)}(i) = d^{(1)}(4i + 3)$ | $M_{symb}^{layer} = M_{symb}^{(0)}/2 = M_{symb}^{(1)}/4$ |
| 6 | 2 | $x^{(0)}(i) = d^{(0)}(i)$<br>$x^{(1)}(i) = d^{(1)}(5i)$<br>$x^{(2)}(i) = d^{(1)}(5i + 1)$<br>$x^{(3)}(i) = d^{(1)}(5i + 2)$<br>$x^{(4)}(i) = d^{(1)}(5i + 3)$<br>$x^{(5)}(i) = d^{(1)}(5i + 4)$ | $M_{symb}^{layer} = M_{symb}^{(0)} = M_{symb}^{(1)}/5$ |

6. A total quantity of layers is seven: There may be six cases. In a first case, L1=6 and L2=1; in a second case, L1=5 and L2=2; in a third case, L1=4 and L2=3; in a fourth case, L1=3 and L2=4; in a fifth case, L1=2 and L2=5; and in a sixth case, L1=1 and L2=6. In this case, a layer mapping relationship may be shown in Table 6:

TABLE 6

Layer mapping example in which a total quantity of layers is seven

| Total quantity of layers | Total quantity of code words | Code word-layer mapping $i = 0, 1, \ldots, M_{symb}^{layer} - 1$ | |
|---|---|---|---|
| 7 | 2 | $x^{(0)}(i) = d^{(0)}(6i)$<br>$x^{(1)}(i) = d^{(0)}(6i + 1)$ | $M_{symb}^{layer} = M_{symb}^{(0)}/6 = M_{symb}^{(1)}$ |

TABLE 6-continued

Layer mapping example in which a total quantity of layers is seven

| Total quantity of layers | Total quantity of code words | Code word-layer mapping $i = 0, 1, \ldots, M_{symb}^{layer} - 1$ | |
|---|---|---|---|
| | | $x^{(2)}(i) = d^{(0)}(6i + 2)$<br>$x^{(3)}(i) = d^{(0)}(6i + 3)$<br>$x^{(4)}(i) = d^{(0)}(6i + 4)$<br>$x^{(5)}(i) = d^{(0)}(6i + 5)$<br>$x^{(6)}(i) = d^{(1)}(i)$ | |
| 7 | 2 | $x^{(0)}(i) = d^{(0)}(5i)$<br>$x^{(1)}(i) = d^{(0)}(5i + 1)$<br>$x^{(2)}(i) = d^{(0)}(5i + 2)$<br>$x^{(3)}(i) = d^{(0)}(5i + 3)$<br>$x^{(4)}(i) = d^{(0)}(5i + 4)$<br>$x^{(5)}(i) = d^{(1)}(2i)$<br>$x^{(6)}(i) = d^{(1)}(2i + 1)$ | $M_{symb}^{layer} = M_{symb}^{(0)}/5 = M_{symb}^{(1)}/2$ |
| 7 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(3i)$<br>$x^{(5)}(i) = d^{(1)}(3i + 1)$<br>$x^{(6)}(i) = d^{(1)}(3i + 2)$ | $M_{symb}^{layer} = M_{symb}^{(0)}/4 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 7 | 2 | $x^{(0)}(i) = d^{(0)}(2i)$<br>$x^{(1)}(i) = d^{(0)}(2i + 1)$<br>$x^{(2)}(i) = d^{(1)}(5i)$<br>$x^{(3)}(i) = d^{(1)}(5i + 1)$<br>$x^{(4)}(i) = d^{(1)}(5i + 2)$<br>$x^{(5)}(i) = d^{(1)}(5i + 3)$<br>$x^{(6)}(i) = d^{(1)}(5i + 4)$ | $M_{symb}^{layer} = M_{symb}^{(0)}/2 = M_{symb}^{(1)}/5$ |
| 7 | 2 | $x^{(0)}(i) = d^{(0)}(i)$<br>$x^{(1)}(i) = d^{(1)}(6i)$<br>$x^{(2)}(i) = d^{(1)}(6i + 1)$<br>$x^{(3)}(i) = d^{(1)}(6i + 2)$<br>$x^{(4)}(i) = d^{(1)}(6i + 3)$<br>$x^{(5)}(i) = d^{(1)}(6i + 4)$<br>$x^{(6)}(i) = d^{(1)}(6i + 5)$ | $M_{symb}^{layer} = M_{symb}^{(0)} = M_{symb}^{(1)}/6$ |

7. A total quantity of layers is eight: There are seven cases. In a first case, L1=7 and L2=1; in a second case, L1=6 and L2=2; in a third case, L1=5 and L2=3; in a fourth case, L1=4 and L2=4; in a fifth case, L1=3 and L2=5; in a sixth case, L1=2 and L2=6; and in a seventh case, L1=1 and L2=7. In this case, a layer mapping relationship may be shown in Table 7:

TABLE 7

Layer mapping example in which a total quantity of layers is eight

| Total quantity of layers | Total quantity of code words | Code word-layer mapping $i = 0, 1, \ldots, M_{symb}^{layer} - 1$ | |
|---|---|---|---|
| 8 | 2 | $x^{(0)}(i) = d^{(0)}(7i)$<br>$x^{(1)}(i) = d^{(0)}(7i + 1)$<br>$x^{(2)}(i) = d^{(0)}(7i + 2)$<br>$x^{(3)}(i) = d^{(0)}(7i + 3)$<br>$x^{(4)}(i) = d^{(0)}(7i + 4)$<br>$x^{(5)}(i) = d^{(0)}(7i + 5)$<br>$x^{(6)}(i) = d^{(0)}(7i + 6)$<br>$x^{(7)}(i) = d^{(1)}(i)$ | $M_{symb}^{layer} = M_{symb}^{(0)}/7 = M_{symb}^{(1)}$ |
| 8 | 2 | $x^{(0)}(i) = d^{(0)}(6i)$<br>$x^{(1)}(i) = d^{(0)}(6i + 1)$<br>$x^{(2)}(i) = d^{(0)}(6i + 2)$<br>$x^{(3)}(i) = d^{(0)}(6i + 3)$ | $M_{symb}^{layer} = M_{symb}^{(0)}/6 = M_{symb}^{(1)}/2$ |

TABLE 7-continued

Layer mapping example in which a total quantity of layers is eight

| Total quantity of layers | Total quantity of code words | Code word-layer mapping $i = 0, 1, \ldots, M_{symb}^{layer} - 1$ | |
|---|---|---|---|
| | | $x^{(4)}(i) = d^{(0)}(6i + 4)$ | |
| | | $x^{(5)}(i) = d^{(0)}(6i + 5)$ | |
| | | $x^{(6)}(i) = d^{(1)}(2i)$ | |
| | | $x^{(7)}(i) = d^{(1)}(2i + 1)$ | |
| 8 | 2 | $x^{(0)}(i) = d^{(0)}(5i)$ | $M_{symb}^{layer} =$ |
| | | $x^{(1)}(i) = d^{(0)}(5i + 1)$ | $M_{symb}^{(0)}/5 = M_{symb}^{(1)}/3$ |
| | | $x^{(2)}(i) = d^{(0)}(5i + 2)$ | |
| | | $x^{(3)}(i) = d^{(0)}(5i + 3)$ | |
| | | $x^{(4)}(i) = d^{(0)}(5i + 4)$ | |
| | | $x^{(5)}(i) = d^{(1)}(3i)$ | |
| | | $x^{(6)}(i) = d^{(1)}(3i + 1)$ | |
| | | $x^{(7)}(i) = d^{(1)}(3i + 2)$ | |
| 8 | 2 | $x^{(0)}(i) = d^{(0)}(4i)$ | $M_{symb}^{layer} =$ |
| | | $x^{(1)}(i) = d^{(0)}(4i + 1)$ | $M_{symb}^{(0)}/4 = M_{symb}^{(1)}/4$ |
| | | $x^{(2)}(i) = d^{(0)}(4i + 2)$ | |
| | | $x^{(3)}(i) = d^{(0)}(4i + 3)$ | |
| | | $x^{(4)}(i) = d^{(1)}(4i)$ | |
| | | $x^{(5)}(i) = d^{(1)}(4i + 1)$ | |
| | | $x^{(6)}(i) = d^{(1)}(4i + 2)$ | |
| | | $x^{(7)}(i) = d^{(1)}(4i + 3)$ | |
| 8 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 = M_{symb}^{(1)}/5$ |
| | | $x^{(2)}(i) = d^{(0)}(3i + 2)$ | |
| | | $x^{(3)}(i) = d^{(1)}(5i)$ | |
| | | $x^{(4)}(i) = d^{(1)}(5i + 1)$ | |
| | | $x^{(5)}(i) = d^{(1)}(5i + 2)$ | |
| | | $x^{(6)}(i) = d^{(1)}(5i + 3)$ | |
| | | $x^{(7)}(i) = d^{(1)}(5i + 4)$ | |
| 8 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 = M_{symb}^{(1)}/6$ |
| | | $x^{(2)}(i) = d^{(1)}(6i)$ | |
| | | $x^{(3)}(i) = d^{(1)}(6i + 1)$ | |
| | | $x^{(4)}(i) = d^{(1)}(6i + 2)$ | |
| | | $x^{(5)}(i) = d^{(1)}(6i + 3)$ | |
| | | $x^{(6)}(i) = d^{(1)}(6i + 4)$ | |
| | | $x^{(7)}(i) = d^{(1)}(6i + 5)$ | |
| 8 | 2 | $x^{(0)}(i) = d^{(0)}(i)$ | $M_{symb}^{layer} =$ |
| | | $x^{(1)}(i) = d^{(1)}(7i)$ | $M_{symb}^{(0)} = M_{symb}^{(1)}/7$ |
| | | $x^{(2)}(i) = d^{(1)}(7i + 1)$ | |
| | | $x^{(3)}(i) = d^{(1)}(7i + 2)$ | |
| | | $x^{(4)}(i) = d^{(1)}(7i + 3)$ | |
| | | $x^{(5)}(i) = d^{(1)}(7i + 4)$ | |
| | | $x^{(6)}(i) = d^{(1)}(7i + 5)$ | |
| | | $x^{(7)}(i) = d^{(1)}(7i + 6)$ | |

In Table 1 to Table 7, if the total quantity of code words is two, the serving cell and the coordinated cell may use one of the two code words each, and the code words used by the serving cell and the coordinated cell may be different.

As can be seen from the above, different from the prior art in which a single code word can be mapped to a plurality of transport layers only during retransmission in spatial multiplexing, in this embodiment of the present invention, if each cell uses one code word for transmission, a single code word may be mapped to a plurality of transport layers during initial transmission.

It should be understood that, Table 1 to Table 7 show only several possible layer mapping examples in this embodiment of the present invention, and are not intended to limit the scope of this embodiment of the present invention. A person skilled in the art obviously may make various equivalent modifications or changes based on the examples in Table 1 to Table 7, and the modifications or changes also fall within the scope of this embodiment of the present invention.

In an optional embodiment, in this embodiment of the present invention, the first network device may perform precoding processing on the first initial modulation symbol mapped to the at least one transport layer, to obtain the at least one first modulation symbol. The precoding processing may be performed according to a codebook or non-codebook manner. Specifically, precoding processing may be independently performed on the first data and the second data. To be specific, precoding processing is performed on the first data and the second data based on precoding matrices respectively corresponding to the first cell and the second cell, or precoding processing is performed on the first data and the second data based on precoding matrices respectively corresponding to the first transmission point and the second transmission point. A precoding matrix corresponding to each cell or each transmission point may be obtained by the terminal device by measuring a reference signal sent by the serving cell. Optionally, the serving cell configures different CSI-RS resources and coordinates with the coordinated cell, so that the terminal device may separately measure channels from a plurality of cells to the terminal device, and send channel state information (CSI) corresponding to each of the plurality of cells to the cell. The CSI may include a precoding matrix index (PMI), include a PMI and an RI, or further include other information. This is not limited in this embodiment of the present invention.

Optionally, the performing, by the first network device, precoding processing on the first initial modulation symbol mapped to the at least one transport layer, to obtain the at least one first modulation symbol includes:

performing, by the first network device based on a first precoding matrix, precoding processing on the first initial modulation symbol mapped to the at least one transport layer, to obtain the at least one first modulation symbol, where the first precoding matrix is determined based on the state of the channel between the terminal device and the first cell or the first transmission point.

Similarly, the second network device may perform, based on a second precoding matrix, precoding processing on the second initial modulation symbol mapped to the at least one transport layer, to obtain the at least one second modulation symbol, where the second precoding matrix is determined based on the state of the channel between the terminal device and the second cell or the second transmission point.

In another optional embodiment, if the first data and the second data are same downlink data, the first network device and the second network device may divide a precoding process into two parts: first performing precoding processing on to-be-transmitted downlink data by using a precoding matrix determined based on a state of a channel between each cell or each transmission point and the terminal device, and then performing further processing on a result of the precoding processing by using an SFBC matrix, to obtain different modulation symbols.

Optionally, if the first network device and the second network device send downlink data by using a total of two antenna ports, an SFBC processing process of the first network device and the second network device may be indicated in formulas (2) and (3):

$$\begin{bmatrix} y^{(0)}(2i) \\ y^{(0)}(2i+1) \end{bmatrix} = \begin{bmatrix} 1 & 0 & j & 0 \\ 0 & 1 & 0 & j \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} ; \text{and} \quad (2)$$

$$\begin{bmatrix} y^{(1)}(2i) \\ y^{(1)}(2i+1) \end{bmatrix} = \begin{bmatrix} 0 & -1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix}. \quad (3)$$

In this case, the first SFBC matrix and the second SFBC matrix may be respectively $$\begin{bmatrix} 1 & 0 & j & 0 \\ 0 & 1 & 0 & j \end{bmatrix} \text{ and } \begin{bmatrix} 0 & -1 & 0 & j \\ 1 & 0 & -j & 0 \end{bmatrix}.$$

In this way, $y^{(0)}(2i)=-y^{(1)}(2i+1)^*$, and $y^{(0)}(2i+1)=y^{(1)}(2i)^*$. For example, the serving cell sends $x_1$ and $x_2$, and the coordinated cell sends $-x_2^*$ and $x_1^*$.

Optionally, if the first network device and the second network device send downlink data by using a total of four antenna ports, an SFBC processing process of the first network device and the second network device may be indicated in formulas (4) and (5):

$$\begin{bmatrix} y^{(0)}(4i) \\ y^{(0)}(4i+1) \\ y^{(1)}(4i+2) \\ y^{(1)}(4i+3) \end{bmatrix} = \begin{bmatrix} 1 & 0 & 0 & 0 & j & 0 & 0 & 0 \\ 0 & 1 & 0 & 0 & 0 & j & 0 & 0 \\ 0 & 0 & 1 & 0 & 0 & 0 & j & 0 \\ 0 & 0 & 0 & 1 & 0 & 0 & 0 & j \end{bmatrix} \begin{bmatrix} \text{Re}(x^{(0)}(i)) \\ \text{Re}(x^{(1)}(i)) \\ \text{Re}(x^{(2)}(i)) \\ \text{Re}(x^{(3)}(i)) \\ \text{Im}(x^{(0)}(i)) \\ \text{Im}(x^{(1)}(i)) \\ \text{Im}(x^{(2)}(i)) \\ \text{Im}(x^{(3)}(i)) \end{bmatrix}; \text{ and} \quad (4)$$

$$\begin{bmatrix} y^{(2)}(4i) \\ y^{(2)}(4i+1) \\ y^{(3)}(4i+2) \\ y^{(3)}(4i+3) \end{bmatrix} = \begin{bmatrix} 0 & -1 & 0 & 0 & 0 & j & 0 & 0 \\ 1 & 0 & 0 & 0 & -j & 0 & 0 & 0 \\ 0 & 0 & 0 & -1 & 0 & 0 & 0 & j \\ 0 & 0 & 1 & 0 & 0 & 0 & -j & 0 \end{bmatrix} \begin{bmatrix} \text{Re}(x^{(0)}(i)) \\ \text{Re}(x^{(1)}(i)) \\ \text{Re}(x^{(2)}(i)) \\ \text{Re}(x^{(3)}(i)) \\ \text{Im}(x^{(0)}(i)) \\ \text{Im}(x^{(1)}(i)) \\ \text{Im}(x^{(2)}(i)) \\ \text{Im}(x^{(3)}(i)) \end{bmatrix}. \quad (5)$$

In this case, the first SFBC matrix and the second SFBC matrix may be respectively $$\begin{bmatrix} 1 & 0 & 0 & 0 & j & 0 & 0 & 0 \\ 0 & 1 & 0 & 0 & 0 & j & 0 & 0 \\ 0 & 0 & 1 & 0 & 0 & 0 & j & 0 \\ 0 & 0 & 0 & 1 & 0 & 0 & 0 & j \end{bmatrix} \text{ and } \begin{bmatrix} 0 & -1 & 0 & 0 & 0 & j & 0 & 0 \\ 1 & 0 & 0 & 0 & -j & 0 & 0 & 0 \\ 0 & 0 & 0 & -1 & 0 & 0 & 0 & j \\ 0 & 0 & 1 & 0 & 0 & 0 & -j & 0 \end{bmatrix},$$

and modulation symbols generated by the first network device and the second network device also satisfy a similar relationship. For example, the serving cell sends $x_1, x_2, 0, 0$ and $0, 0, x_3, x_4$, and the coordinated cell sends $-x_2^*, x_1^*, 0, 0$ and $0, 0, -x_4^*, x_3^*$.

Optionally, the serving cell may determine an SFBC matrix used by each cell, and send, to a coordinated cell, fifth indication information used to indicate an SFBC matrix used by the coordinated cell. However, this embodiment of the present invention is not limited thereto.

Optionally, if the first data and the second data are same downlink data, the first network device performs precoding processing on the first initial modulation symbol by using the first precoding matrix, to obtain a first intermediate modulation symbol. The second network device performs precoding processing on the second initial modulation symbol by using the second precoding matrix, to obtain a second intermediate modulation symbol. The first precoding matrix is determined based on the state of the channel between the first cell or the first transmission point and the terminal device. The second precoding matrix is determined based on the state of the channel between the second cell or the second transmission point and the terminal device.

The first network device performs precoding processing on the first intermediate modulation symbol by using the first SFBC matrix, to obtain at least two first modulation symbols. The second network device performs precoding processing on the second intermediate modulation symbol by using the second SFBC matrix, to obtain at least two second modulation symbols. The at least two first modulation symbols include x1 and x2, the at least two second modulation symbols include x3 and x4, and x1=x4* and x2=x3*.

In this embodiment of the present invention, because the first network device and the second network device first independently perform precoding processing on to-be-transmitted downlink data and then perform SFBC processing, the terminal device may not demodulate received data by using a cell-level reference signal (for example, a CRS), and instead demodulates the data based on a demodulation reference signal (DMRS) in downlink data. However, this embodiment of the present invention is not limited thereto.

In this case, the first network device and the second network device may use a single code word and use a same code word. Optionally, quantities of transport layers used when the first network device and the second network device transmit the downlink data may be both 1 or 2, and respectively correspond to cases of two antenna ports and four antenna ports. Optionally, the first network device and the second network device may process the downlink data by using a same initial scrambling code value. In addition, the first network device and the second network device may send the at least one first modulation symbol and the at least one second modulation symbol by using a same resource block and antenna ports having different port numbers. However, this embodiment of the present invention is not limited thereto.

Optionally, in another embodiment, if the first data and the second data are same downlink data, the serving cell of the terminal device may further send indication information to the coordinated cell. The indication information is used to indicate a quantity of transport layers in current transmission and/or a modulation symbol to be sent in the serving cell, so that the coordinated cell performs layer mapping processing and precoding processing based on the quantity of transport layers and/or the modulation symbol. However, this embodiment of the present invention is not limited thereto.

Optionally, a network side device (which may also be referred to as a network device, for example, the serving cell of the terminal device) may determine a transmission manner used in current coordinated transmission. The transmission manner may be the foregoing multiflow transmission or transmit diversity transmission, and higher layer signaling may be used to notify the terminal device of the transmission manner used in the current coordinated transmission.

Optionally, coordinated multipoint multiflow transmission and coordinated multipoint transmit diversity transmission may be configured as two different transmission modes. Correspondingly, a network side device may add, to higher layer signaling, sequence number information corresponding to a transmission mode of current multipoint coordinated transmission, to indicate a transmission manner of current data transmission. Alternatively, coordinated multipoint multiflow transmission and coordinated multipoint transmit diversity transmission may be configured as two different transmission manners of a same transmission mode (for example, a coordinated multipoint transmission mode). Correspondingly, a network side device may first add, to higher layer signaling, sequence number information corresponding to a current coordinated multipoint transmission mode, and then indicate a transmission manner of the coordinated multipoint transmission mode by using physical layer signaling (for example, downlink control information (DCI)), so that the terminal device receives downlink data transmitted in current coordinated transmission. However, this embodiment of the present invention is not limited thereto.

The foregoing describes the data transmission method according to this embodiment of the present invention in detail from a perspective of the network device with reference to FIG. 1 to FIG. 3. The following describes a data transmission method according to an embodiment of the present invention from a perspective of a terminal device with reference to FIG. 4.

Figure 4:
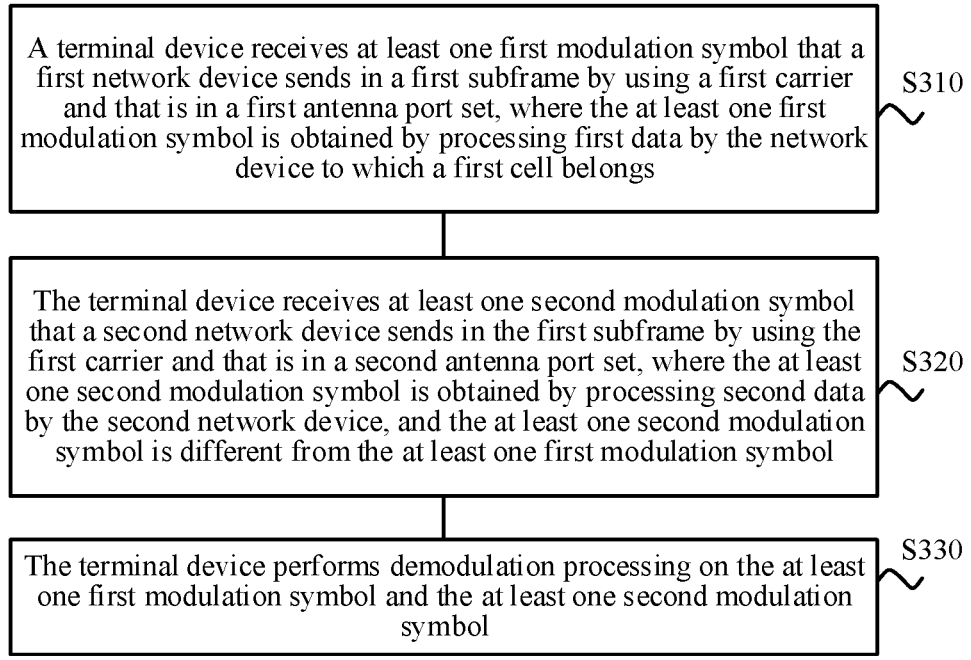
FIG. 4 is a schematic flowchart of another data transmission method according to an embodiment of the present invention.

FIG. 4 shows another data transmission method 300 according to an embodiment of the present invention. The method may be performed by a terminal device. As shown in FIG. 4, the method 300 includes the following steps.

S310. A terminal device receives at least one first modulation symbol that a first network device sends in a first subframe by using a first carrier and that is in a first antenna port set, where the at least one first modulation symbol is obtained by processing first data by the first network device to which a first cell belongs.

S320. The terminal device receives at least one second modulation symbol that a second network device sends in the first subframe by using the first carrier and that is in a second antenna port set, where the at least one second modulation symbol is obtained by processing second data by the second network device, and the at least one second modulation symbol is different from the at least one first modulation symbol.

S330. The terminal device performs demodulation processing on the at least one first modulation symbol and the at least one second modulation symbol.

The first antenna port set includes at least one first antenna port of the first cell, and the second antenna port set includes at least one second antenna port of a second cell. Alternatively, the first antenna port set includes at least one first antenna port of a first transmission point, and the second antenna port set includes at least one second antenna port of a second transmission point.

The at least one first antenna port is different from the at least one second antenna port.

Optionally, the first network device obtains the at least one first modulation symbol by sequentially performing scrambling processing, layer mapping processing, and precoding processing on a first coded bit corresponding to the first data. The second network device obtains the at least one second modulation symbol by sequentially performing scrambling processing, layer mapping processing, and precoding processing on a second coded bit corresponding to the second data.

In an optional embodiment, the at least one first modulation symbol is obtained by the first network device by performing, based on a cell identifier of the first cell or a cell to which the first transmission point belongs, scrambling processing on the first coded bit corresponding to the first data. The at least one second modulation symbol is obtained by the second network device by performing, based on a cell identifier of the second cell or a cell to which the second transmission point belongs, scrambling processing on the second coded bit corresponding to the second data.

In an optional embodiment, the method 300 further includes:

receiving, by the terminal device, second indication information sent by a network device to which a serving cell belongs, where the second indication information is used to indicate a cell identifier of a coordinated cell, the serving cell is the first cell or the second cell, and the coordinated cell is one of the first cell and the second cell other than the serving cell.

Correspondingly, S330 of performing, by the terminal device, demodulation processing on the at least one first modulation symbol and the at least one second modulation symbol includes:

performing, by the terminal device, demodulation processing on the received at least one first modulation symbol or the received at least one second modulation symbol based on the cell identifier of the coordinated cell.

In this case, the terminal device may perform, based on a cell identifier of each cell, demodulation processing on a modulation symbol corresponding to the cell. Alternatively, the terminal device may perform, based on a cell identifier of a cell to which each transmission point belongs, demodulation processing on a modulation symbol corresponding to the transmission point.

In an optional embodiment, the first network device obtains the at least one first modulation symbol by performing, based on a quantity of at least one first transport layer, layer mapping processing on a first initial modulation symbol corresponding to a first scrambled bit. The quantity of the at least one first transport layer is determined based on a channel state of a transmission channel between the first cell or the first transmission point and the terminal device. The second network device obtains the at least one second modulation symbol by performing, based on a quantity of at least one second transport layer, layer mapping processing on a second initial modulation symbol corresponding to a second scrambled bit. The quantity of the at least one second transport layer is determined based on a channel state of a transmission channel between the second cell or the second transmission point and the terminal device.

In an optional embodiment, the quantity of the first transport layer is obtained by the first network device by adjusting a value of a first transmission rank that is determined based on the channel state of the transmission channel between the first cell or the first transmission point and the terminal device. The quantity of the second transport layer is obtained by the second network device by adjusting a value of a second transmission rank that is determined based on the channel state of the transmission channel between the second cell or the second transmission point and the terminal device. A sum of the value of the first transmission rank and the value of the second transmission rank is greater than a quantity of receive antennas of the terminal device. An adjusted value of the first transmission rank is equal to or not equal to the value of the first transmission rank, an adjusted value of the second transmission rank is equal to or not equal to the value of the second transmission rank, and a sum of the adjusted value of the first transmission rank and the adjusted value of the second transmission rank is less than or equal to the quantity of the receive antennas of the terminal device.

In an optional embodiment, the first network device obtains the at least one first modulation symbol by performing, based on a first precoding matrix, precoding processing on the first initial modulation symbol mapped to at least one transport layer. The first precoding matrix is determined based on the channel state of the transmission channel between the terminal device and the first cell or the first transmission point. The second network device obtains the at least one second modulation symbol by performing, based on a second precoding matrix, precoding processing on the second initial modulation symbol mapped to at least one transport layer. The second precoding matrix is determined based on the channel state of the transmission channel between the terminal device and the second cell or the second transmission point.

In an optional embodiment, the at least one second modulation symbol is sent by the second network device by using a second resource block on the first carrier, and the at least one first modulation symbol is sent by the first network device by using the second resource block or a first resource block that is on the first carrier and that is different from the second resource block.

In an optional embodiment, if the first network device sends the at least one first modulation symbol by using the second resource block, a port number of any first antenna port in the first antenna port set is different from a port number of any second antenna port in the second antenna port set.

In an optional embodiment, the method 300 further includes:

receiving, by the terminal device, third indication information sent by the first network device and/or the second network device, where the third indication information is used to indicate a quantity of transport layers used when the first network device sends the at least one first modulation symbol and a quantity of transport layers used when the second network device sends the at least one second modulation symbol.

In an optional embodiment, the first data is different from the second data.

In an optional embodiment, the first data and the second data are same downlink data. The first network device obtains the at least two first modulation symbol by performing precoding processing on the first initial modulation symbol by using a first SFBC matrix. The at least two first modulation symbols include x1 and x2. The second network device obtains the at least two second modulation symbol by performing, by using a second SFBC matrix, precoding processing on a second initial modulation symbol corresponding to the downlink data. The at least two second modulation symbols include x3 and x4, and x1=x4* and x2=−x3*.

It should be noted that, sequence numbers of the foregoing processes do not indicate an execution sequence, and an execution sequence of processes should be determined based on functions and internal logic thereof, and shall constitute no limitation on an implementation process of the embodiments of the present invention.

An embodiment of the present invention further provides another data transmission method. The method includes: sending, by a first network device, first indication information to a terminal device. The first indication information is used to indicate a port number of at least one first antenna port of a first cell and/or a port number of at least one second antenna port of a second cell. At least one first modulation symbol of the at least one first antenna port and at least one second modulation symbol of the at least one second antenna port are sent to the terminal device in a same subframe and on a same carrier. The at least one first antenna port is different from the at least one second antenna port, and the at least one first modulation symbol is different from the at least one second modulation symbol.

An embodiment of the present invention further provides another data transmission method. The method includes: sending, by a first network device, first indication information to a terminal device. The first indication information is used to indicate a port number of at least one first antenna port of a first transmission point and/or a port number of at least one second antenna port of a second transmission point different from the first transmission point. At least one first modulation symbol of the at least one first antenna port and at least one second modulation symbol of the at least one second antenna port are sent to the terminal device in a same subframe and on a same carrier. The at least one first modulation symbol is different from the at least one second modulation symbol.

An embodiment of the present invention further provides another data transmission method. The method includes: sending, by a first network device, second indication information to a terminal device. The second indication information is used to indicate a cell identifier of a coordinated cell. At least one first modulation symbol of at least one first antenna port of a serving cell and at least one second modulation symbol of at least one second antenna port of a coordinated cell are sent to the terminal device in a same subframe and on a same carrier. The at least one first modulation symbol is different from the at least one second modulation symbol.

An embodiment of the present invention further provides another data transmission method. The method includes: sending, by a first network device, third indication information to a terminal device. The third indication information is used to indicate a quantity of transport layers used when at least one first modulation symbol that is in a first antenna port set of a first cell is sent in a first subframe and on a first carrier, and/or is used to indicate a quantity of transport layers used when at least one second modulation symbol that is in a second antenna port set of a second cell is sent to the terminal device in the first subframe and on the first carrier. At least one first antenna port in the first antenna port set is different from at least one second antenna port in the second antenna port set, and the at least one first modulation symbol is different from the at least one second modulation symbol.

An embodiment of the present invention further provides another data transmission method. The method includes: sending, by a first network device, fourth indication information to a second network device. The fourth indication information is used to indicate at least one of the following: a quantity of transport layers and at least two first modulation symbols of at least one first antenna port that are to be transmitted by the first network device. The at least two first modulation symbols are different from at least two second modulation symbols of at least one second antenna port that are to be transmitted by the second network device.

An embodiment of the present invention further provides another data transmission method. The method includes: sending, by a first network device, fifth indication information to a second network device. The fifth indication information is used to indicate a first SFBC matrix used when the second network device processes downlink data transmitted to a terminal device in a first subframe and on a first carrier. The first carrier and the first subframe are further used by the first network device to transmit at least one second modulation symbol obtained by processing the downlink data based on a second SFBC matrix.

It may be understood that, exchange of the indication information may be combined with or independent from the foregoing data transmission method, and the indication information may be independent from each other or may be used in combination with each other.

The foregoing describes the data transmission method according to the embodiments of the present invention in detail with reference to FIG. 1 to FIG. 4, and the following describes a data transmission apparatus according to the embodiments of the present invention with reference to FIG. 5 to FIG. 8.

Figure 5:
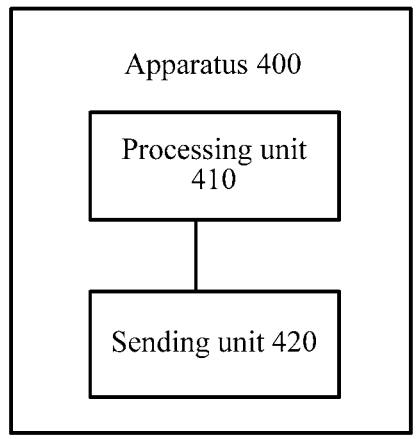
FIG. 5 is a schematic block diagram of a data transmission apparatus according to an embodiment of the present invention.

FIG. 5 shows a data transmission apparatus 400 according to an embodiment of the present invention. The apparatus 400 includes:

a processing unit 410, configured to process first data to obtain at least one first modulation symbol that is in a first antenna port set, where the first antenna port set includes at least one first antenna port of a first cell; and a sending unit 420, configured to send the at least one first modulation symbol obtained by the processing unit 410 to a terminal device in a first subframe by using a first carrier, where the at least one first modulation symbol is different from at least one second modulation symbol that a network device to which a second cell belongs sends to the terminal device in the first subframe by using the first carrier and that is in a second antenna port set, the at least one second modulation symbol is obtained by processing second data by the network device to which the second cell belongs, the second antenna port set includes at least one second antenna port of the second cell, and the at least one second antenna port is different from the at least one first antenna port.

The data transmission apparatus 400 according to this embodiment of the present invention may correspond to the first network device in the data transmission method according to the embodiments of the present invention. The foregoing and other operations and/or functions of the modules of the data transmission apparatus 400 are separately used to implement corresponding procedures of the methods in FIG. 2 and FIG. 3. For brevity, details are not described herein again.

Figure 6:
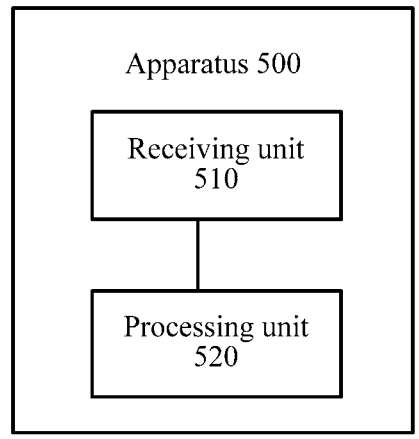
FIG. 6 is a schematic block diagram of another data transmission apparatus according to an embodiment of the present invention.

FIG. 6 shows another data transmission apparatus 500 according to an embodiment of the present invention. The apparatus 500 includes:

a receiving unit 510, configured to: receive at least one first modulation symbol that a first network device sends in a first subframe by using a first carrier and that is in a first antenna port set, and receive at least one second modulation symbol that a second network device sends in the first subframe by using the first carrier and that is in a second antenna port set, where the at least one first modulation symbol is obtained by processing first data by the first network device to which a first cell belongs, the at least one second modulation symbol is obtained by processing second data by a second network device, the at least one second modulation symbol is different from the at least one first modulation symbol, the first antenna port set includes at least one first antenna port of the first cell and the second antenna port set includes at least one second antenna port of a second cell, alternatively, the first antenna port set includes at least one first antenna port of a first transmission point and the second antenna port set includes at least one second antenna port of a second transmission point, and the at least one first antenna port is different from the at least one second antenna port; and a processing unit 520, configured to perform demodulation processing on the at least one first modulation symbol and the at least one second modulation symbol received by the receiving unit 510.

The data transmission apparatus 500 according to this embodiment of the present invention may correspond to the terminal device in the data transmission method according to the embodiments of the present invention. The foregoing and other operations and/or functions of the modules of the data transmission apparatus 500 are separately used to implement corresponding procedures of the method in FIG. 4. For brevity, details are not described herein again.

Figure 7:
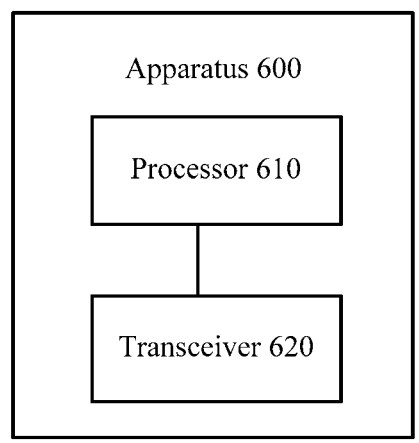
FIG. 7 is a schematic block diagram of another data transmission apparatus according to an embodiment of the present invention.

FIG. 7 shows another data transmission apparatus 600 according to an embodiment of the present invention. The apparatus 600 includes:

a processor 610, configured to process first data to obtain at least one first modulation symbol that is in a first antenna port set, where the first antenna port set includes at least one first antenna port of a first cell; and a transceiver 620, configured to send the at least one first modulation symbol obtained by the processor 610 to a terminal device in a first subframe by using a first carrier, where the at least one first modulation symbol is different from at least one second modulation symbol that a network device to which a second cell belongs sends to the terminal device in the first subframe by using the first carrier and that is in a second antenna port set, the at least one second modulation symbol is obtained by processing second data by the network device to which the second cell belongs, the second antenna port set includes at least one second antenna port of the second cell, and the at least one second antenna port is different from the at least one first antenna port.

The data transmission apparatus 600 according to this embodiment of the present invention may correspond to the first network device in the data transmission method according to the embodiments of the present invention. The foregoing and other operations and/or functions of the modules of the data transmission apparatus 600 are separately used to implement corresponding procedures of the methods in FIG. 2 and FIG. 3. For brevity, details are not described herein again.

Figure 8:
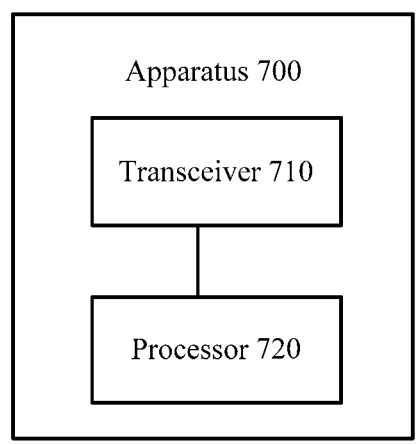
FIG. 8 is a schematic block diagram of another data transmission apparatus according to an embodiment of the present invention.

FIG. 8 shows another data transmission apparatus 700 according to an embodiment of the present invention. The apparatus 700 includes:

a transceiver 710, configured to: receive at least one first modulation symbol that a first network device sends in a first subframe by using a first carrier and that is in a first antenna port set, and receive at least one second modulation symbol that a second network device sends in the first subframe by using the first carrier and that is in a second antenna port set, where the at least one first modulation symbol is obtained by processing first data by the first network device to which a first cell belongs, the at least one second modulation symbol is obtained by processing second data by the second network device, the at least one second modulation symbol is different from the at least one first modulation symbol, the first antenna port set includes at least one first antenna port of the first cell and the second antenna port set includes at least one second antenna port of a second cell, alternatively, the first antenna port set includes at least one first antenna port of a first transmission point and the second antenna port set includes at least one second antenna port of a second transmission point, and the at least one first antenna port is different from the at least one second antenna port; and a processor 720, configured to perform demodulation processing on the at least one first modulation symbol and the at least one second modulation symbol received by the transceiver 710.

The data transmission apparatus 700 according to this embodiment of the present invention may correspond to the terminal device in the data transmission method according to the embodiments of the present invention. The foregoing and other operations and/or functions of the modules of the data transmission apparatus 700 are separately used to implement corresponding procedures of the method in FIG. 4. For brevity, details are not described herein again.

It should be understood that, in this embodiment of the present invention, the processor may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

Optionally, the apparatus may further include a memory. The memory may include a read-only memory and a random access memory, and provide an instruction and data for the processor. A part of the memory may further include a non-volatile random access memory. For example, the memory may further store device type information.

In an implementation process, the steps of the foregoing methods may be performed by a hardware integrated logic circuit in the processor or an instruction in a form of software. Steps of the method disclosed with reference to the embodiments of the present invention may be directly performed by a hardware processor, or may be performed by a combination of hardware and software modules in the processor. The software module may be located in a mature storage medium in the art such as a random access memory, a flash memory, a read-only memory, a programmable read-only memory, an electrically erasable programmable memory, or a register. The storage medium is located in the memory, and the processor reads the instruction in the memory and performs the steps in the foregoing methods in combination with hardware thereof. To avoid repetition, details are not described herein again.

In addition, an embodiment of the present invention further provides a communications system, including the network device to which the first cell belongs and the network device to which the second cell belongs in the foregoing embodiments, or including the first transmission point and the second transmission point in the foregoing embodiments.

It should be understood that, in the embodiments of the present invention, terms "first" and "second" are used only for ease of description and understanding, and shall constitute no limitation on the embodiments of the present invention. A "first X" and a "second X" may correspond to a same X or different Xs unless otherwise clearly described in the specification or clearly indicated in context. For example, the first network device and the second network device may be a same network device or different network devices, the first cell and the second cell may be a same cell or different cells, and the first data and the second data may be same or different data.

It should be also understood that, descriptions of the embodiments in this specification focus on differences between embodiments, and for same or similar parts not mentioned, reference may be made to each other. For example, for the method embodiments or the apparatus embodiments on a terminal device side, refer to descriptions of the method embodiments on a network device side.

It should be also understood that, the network device in the embodiments of the present invention may be a network side device, or a terminal device in D2D communication or M2M communication. In the foregoing embodiments, an example in which the network device is specifically a network side device is used for description. However, this embodiment of the present invention is not limited thereto.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, may be located in one position, or may be distributed on a plurality of network units. Some or all of the units may be selected depending on actual needs to achieve the objectives of the solutions of the embodiments of the present invention.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in the present invention shall fall within the protection scope of this application. Therefore, the protection scope of this application shall be subject to the protection scope of the claims.

What is claimed is:

1. A network device, comprising:
at least one processor;
a non-transitory computer-readable storage medium coupled to the at least one processor and storing programming instructions for execution by the at least one processor, wherein the programming instructions instruct the network device to coordinate with a second network device in transmission to a terminal device, and wherein the programming instructions instruct the at least one processor to:
wherein in response to determining that a first cell belonging to the network device is a coordinated cell of the terminal device, determine a quantity of at least one transport layer based on a channel state of a transmission channel between the first cell and the terminal device by operations comprising:
determining a value of a first transmission rank based on the channel state of the transmission channel between the first cell and the terminal device;
wherein in response to determining that a sum of the value of the first transmission rank and a value of a second transmission rank is greater than a quantity of receive antennas of the terminal device, determining an adjusted value of the first transmission rank, wherein:
the value of the second transmission rank is determined based on a channel state of a transmission channel between a second cell belonging to the second network device and the terminal device,
the adjusted value of the first transmission rank is equal to or not equal to the value of the first transmission rank, an adjusted value of the second transmission rank is equal to or not equal to the value of the second transmission rank, and
a sum of the adjusted value of the first transmission rank and the adjusted value of the second transmission rank is less than or equal to the quantity of receive antennas of the terminal device; and
determining the quantity of at least one transport layer as the adjusted value of the first transmission rank; and
process first data to obtain at least one first modulation symbol using a first antenna port set, wherein the first antenna port set comprises at least one first antenna port; and
a transmitter, configured to send the at least one first modulation symbol obtained by the at least one processor to the terminal device in a first time-frequency resource by using a first carrier, wherein the at least one first modulation symbol is different from at least one second modulation symbol that the second network device sends to the terminal device in the first time-frequency resource by using the first carrier and a second antenna port set, the at least one second modulation symbol is obtained by processing second data by the second network device, the second antenna port set comprises at least one second antenna port, and the at least one second antenna port is different from the at least one first antenna port.

2. The network device according to claim 1, wherein processing the first data to obtain the at least one first modulation symbol using the first antenna port set comprises:
performing scrambling processing on a first coded bit corresponding to the first data, to obtain a first scrambled bit;
performing layer mapping processing on a first initial modulation symbol corresponding to the first scrambled bit, to obtain the first initial modulation symbol mapped to the at least one transport layer; and
performing precoding processing on the first initial modulation symbol mapped to the at least one transport layer, to obtain the at least one first modulation symbol that is in the first antenna port set.

3. The network device according to claim 2, wherein performing scrambling processing on the first coded bit corresponding to the first data, to obtain the first scrambled bit comprises:
if the first cell belonging to the network device is a coordinated cell of the terminal device:
determining an initial scrambling code value based on a cell identifier of the first cell; and
performing scrambling processing on the first coded bit corresponding to the first data by using the initial scrambling code value, to obtain the first scrambled bit.

4. The network device according to claim 2, wherein performing layer mapping processing on the first initial modulation symbol corresponding to the first scrambled bit, to obtain the first initial modulation symbol mapped to the at least one transport layer comprises:
if the first cell belonging to the network device is a coordinated cell of the terminal device, performing, based on the quantity of at least one transport layer, layer mapping processing on the first initial modulation symbol corresponding to the first scrambled bit, to obtain the first initial modulation symbol mapped to the at least one transport layer.

5. The network device according to claim 1, wherein the transmitter is specifically configured to:
if the second network device sends the at least one second modulation symbol to the terminal device by using a second resource block on the first carrier, send the at least one first modulation symbol to the terminal device by using the second resource block or a first resource block that is on the first carrier and that is different from the second resource block.

6. The network device according to claim 5, wherein if the transmitter sends the at least one first modulation symbol to the terminal device by using the second resource block, a port number of any first antenna port in the first antenna port set is different from a port number of any second antenna port in the second antenna port set.

7. The network device according to claim 1, wherein the first data is different from the second data.

8. A data transmission method performed at a network device, comprising:
  wherein in response to determining that a first cell belonging to the network device is a coordinated cell of a terminal device, determining quantity of at least one transport layer based on a channel state of a transmission channel between the first cell and the terminal device, comprising:
    determining a value of a first transmission rank based on the channel state of the transmission channel between the first cell and the terminal device;
    wherein in response to determining that a sum of the value of the first transmission rank and a value of a second transmission rank is greater than a quantity of receive antennas of the terminal device, determining an adjusted value of the first transmission rank, wherein:
    the value of the second transmission rank is determined based on a channel state of a transmission channel between a second cell belonging to a second network device and the terminal device,
    the adjusted value of the first transmission rank is equal to or not equal to the value of the first transmission rank, an adjusted value of the second transmission rank is equal to or not equal to the value of the second transmission rank, and
    a sum of the adjusted value of the first transmission rank and the adjusted value of the second transmission rank is less than or equal to the quantity of receive antennas of the terminal device; and
    determining the quantity of at least one transport layer as the adjusted value of the first transmission rank;
  processing first data to obtain at least one first modulation symbol using a first antenna port set, wherein the first antenna port set comprises at least one first antenna port; and
  sending the at least one first modulation symbol to the terminal device in a first time-frequency resource by using a first carrier, wherein the at least one first modulation symbol is different from at least one second modulation symbol that the second network device sends to the terminal device in the first time-frequency resource by using the first carrier and a second antenna port set, the at least one second modulation symbol is obtained by processing second data by the second network device, the second antenna port set comprises at least one second antenna port, and the at least one second antenna port is different from the at least one first antenna port.

9. The method according to claim 8, wherein processing the first data to obtain the at least one first modulation symbol using the first antenna port set comprises:
  performing scrambling processing on a first coded bit corresponding to the first data, to obtain a first scrambled bit;
  performing layer mapping processing on a first initial modulation symbol corresponding to the first scrambled bit, to obtain the first initial modulation symbol mapped to the at least one transport layer; and
  performing precoding processing on the first initial modulation symbol mapped to the at least one transport layer, to obtain the at least one first modulation symbol that is in the first antenna port set.

10. The method according to claim 9, wherein performing scrambling processing on the first coded bit corresponding to the first data, to obtain the first scrambled bit comprises:
  if the first cell belonging to the network device is a coordinated cell of the terminal device:
    determining an initial scrambling code value based on a cell identifier of the first cell; and
    performing scrambling processing on the first coded bit corresponding to the first data by using the initial scrambling code value, to obtain the first scrambled bit.

11. The method according to claim 9, wherein performing layer mapping processing on the first initial modulation symbol corresponding to the first scrambled bit, to obtain the first initial modulation symbol mapped to the at least one transport layer comprises:
  if the first cell belonging to the network device is a coordinated cell of the terminal device, performing, based on the quantity of at least one transport layer, layer mapping processing on the first initial modulation symbol corresponding to the first scrambled bit, to obtain the first initial modulation symbol mapped to the at least one transport layer.

12. The method according to claim 8, further comprising:
  if the second network device sends the at least one second modulation symbol to the terminal device by using a second resource block on the first carrier, sending the at least one first modulation symbol to the terminal device by using the second resource block or a first resource block that is on the first carrier and that is different from the second resource block.

13. The method according to claim 12, wherein if the network device sends the at least one first modulation symbol to the terminal device by using the second resource block, a port number of any first antenna port in the first antenna port set is different from a port number of any second antenna port in the second antenna port set.

14. The method according to claim 8, wherein the first data is different from the second data.

* * * * *